United States Patent
Tang et al.

(10) Patent No.: US 7,290,024 B2
(45) Date of Patent: Oct. 30, 2007

(54) METHODS AND APPARATUS FOR PERFORMING MATHEMATICAL OPERATIONS USING SCALED INTEGERS

(75) Inventors: Ping T. Tang, Hayward, CA (US); Gopi K. Kolli, Concord, MA (US)

(73) Assignee: Intel Corporation, Santa Clara, CA (US)

( * ) Notice: Subject to any disclaimer, the term of this patent is extended or adjusted under 35 U.S.C. 154(b) by 759 days.

(21) Appl. No.: 10/740,086

(22) Filed: Dec. 18, 2003

(65) Prior Publication Data

US 2005/0138101 A1 Jun. 23, 2005

(51) Int. Cl.
*G06F 7/483* (2006.01)
(52) U.S. Cl. .................................... 708/503
(58) Field of Classification Search ............ 708/503
See application file for complete search history.

(56) References Cited

U.S. PATENT DOCUMENTS

| | | | | |
|---|---|---|---|---|
| 4,603,323 | A * | 7/1986 | Hassitt et al. ............ | 341/75 |
| 6,182,100 | B1 * | 1/2001 | Schmookler ............. | 708/277 |
| 6,232,894 | B1 * | 5/2001 | Kawasaki ................. | 341/83 |
| 6,516,332 | B1 * | 2/2003 | Carter ...................... | 708/495 |

OTHER PUBLICATIONS

"IEEE Standard for Floating-point Arithmetic." ANSI/IEEE Standard 754-1985, pp. 1-18. Published by The Institute of Electrical and Electronics Engineers, Inc., New York, New York. 1985.

Hollasch, S. IEEE Standard 754 Floating Point Numbers. pp. 1-6. [retrieved on Oct. 30, 2003]. Retrieved from the Internet: <URL: http://research.microsoft.com/~hollasch/cgindex/coding/ieeefloat.html>.

Zadrozny, W., "Axiomatizations of Floating Point Arithmetics" Proceedings of the Symposium on Computer Arithmetic. Urbana, Jun. 4-6, 1985, Silver Spring IEEE Computer Society PR, US, vol. SYMP. 7, Jun. 4, 1985.

"16-Bit Floating-Point Math in an 8-Bit Microprocessor", IBM Technical Disclosure Bulletin, IBM Corp. New York, US, vol. 32, No. 7, Dec. 1, 1989 (2 Pages).

C. Locke, "Scaled Arithmetic Macroinstructions", IBM Technical Disclosure Bulletin, vol. 13, No. 12, May 1971 (1 Page).

(Continued)

*Primary Examiner*—D. H. Malzahn
(74) *Attorney, Agent, or Firm*—Hanley, Flight & Zimmerman, LLC

(57) ABSTRACT

Methods, apparatus, and articles of manufacture for performing mathematical operations using scaled integers are disclosed. In particular, an example method identifies a scaled-integer value and determines a multiplier value and a scale value based on the scaled-integer value. The multiplier value is determined by extracting information from a first portion of a bitfield based on the scaled-integer value. The scale value is determined by extracting information from a second portion of the bitfield based on the scaled-integer value. The first and second portions of the bitfield are configurable to include signed integer values. The example method then performs an arithmetic operation based on the multiplier value and the scale value.

51 Claims, 9 Drawing Sheets

OTHER PUBLICATIONS

K. Hwang, "Computer Arithmetic, Principles, Architecture, and Design" 1979, Wiley & Sons, New York, NY, USA 120520, XP002325374, pp. 292-295, Figure 9.2 (4 Pages).

Seehyn Kim, et al., "A Floating-Point to Fixed-Point Assembly Program Translator for The TMS 320C25", IEEE Transactions on Circuits and Systems II: Analog and Digital Signal Processing, IEEE INC. New York, US, vol. 41, No. 11, Nov. 1, 1994 (5 Pages).

Kim, et al., "A Floating-Point to Fixed-Point Asembly Program Translator", IEEE Transactions on Circuits and Systems—II: Analog and Digital Signal Processing, vol. 41. No. 11 Nov. 1994. (5 Pages).

International Searching Authority, "International Search Report and the Written Opinion of the International Searching Authority, or the Declaration", Mailed on May 25, 2005, (15 Pages).

International Preliminary Report on Patentability corresponding to International Application No. PCT/US2004/040361, Jun. 29, 2006, 9 pages.

* cited by examiner

METHODS AND APPARATUS FOR PERFORMING MATHEMATICAL OPERATIONS USING SCALED INTEGERS

FIELD OF THE DISCLOSURE

The present disclosure relates generally to processor systems and, more particularly, to methods, apparatus, and articles of manufacture for performing mathematical operations using scaled integers.

BACKGROUND

Many applications such as graphics processing applications include computationally-intensive operations that are typically implemented using integer-based operations and/or floating-point-based operations. For example, many mobile processors, such as those in the Intel® XScale® processor family, are integer-based processors that provide native integer-based operations. Known lower performance graphics applications are often executed on integer-based processors using an integer data type. However, high-performance graphics applications require computations based on numbers having a numeric range that exceeds the range of the integer data type typically used by integer-based processors.

Many computationally-intensive applications, including high-performance graphics applications, require a floating-point data type, which provides a numeric range that exceeds the numeric range typically provided by integer data types. The limited numeric range provided by the integer data types is often overcome by executing floating-point emulation software on integer-based processors.

Executing graphics applications using the integer data type can provide acceptable animation speed, but typically results in reduced picture quality due to the limited numeric range of the integer data type. On the other hand, executing graphics applications using the floating-point data type results in relatively better picture quality, but typically results in slow animation speed due to the processing overhead required to execute the floating-point emulation software.

Handheld platforms such as, for example, handheld platforms based on the Intel® XScale® family of processors usually implement graphics applications using a fixed-point implementation or a floating-point implementation. The fixed-point implementation is based on a fixed-point data type that may be implemented using the integer data type. However, most current graphics applications are designed to use the floating-point data type. As a result, the fixed-point implementation involves rebuilding the software infrastructure of current graphics applications to function with the fixed-point data type.

The fixed-point data type includes a 16-bit integer portion followed by a 16-bit fractional portion and has been implemented in the Intel® Graphics Performance Primitives (GPP) library. Graphics applications using the fixed-point data type use fixed-point operations, which execute at speeds equal to integer operations because the fixed-point data type is implemented based on the integer data type, which is native to most handheld platform processors. Additionally, graphics applications that use the fixed-point data type can provide a relatively high frame-rate on handheld platforms, which results in acceptable performance of computationally-intensive graphics applications such as, for example, gaming applications.

However, the fixed-point implementation often results in high development costs associated with rebuilding software applications that have been designed to work with large dynamic numeric ranges such as the floating-point implementation. In particular, a significant portion of the lower layer software of the graphics applications requires rebuilding to work with the fixed-point and integer data types.

The fixed-point implementation also provides a more limited dynamic numeric range than the floating-point implementation. This limited dynamic numeric range results in a loss of relative precision because of the non-optimal manual scaling of data associated with the fixed-point data type. The relatively low precision associated with the fixed-point data type often results in visual artifacts that are generally perceptible to the typical consumer.

The floating-point implementation for handheld platforms involves executing existing graphics applications or lower-level software such as Direct3D and OpenGL on top of floating-point emulation software, thereby eliminating the need to rebuild the software to use a new data type such as the fixed-point data type. The floating-point implementation usually involves relatively low development costs because many current applications do not need to be rebuilt to use the floating-point data type. Additionally, with the floating-point implementation, the resultant graphics quality is high due to the relatively high dynamic numeric range of the floating-point data type.

Unfortunately, performance of a floating-point implementation based on floating-point emulation software is relatively low. As a result, only less computationally-intensive graphics applications can be executed with acceptable performance using such a floating-point implementation. For example, a floating-point implementation based on floating-point emulation software is too slow for computationally-intensive graphics applications requiring a relatively high frame rate (e.g., gaming applications). Additionally, the power consumption associated with processing floating-point-based operations is relatively high compared to the power consumption associated with integer-based operations.

DETAILED DESCRIPTION

Figure 1:
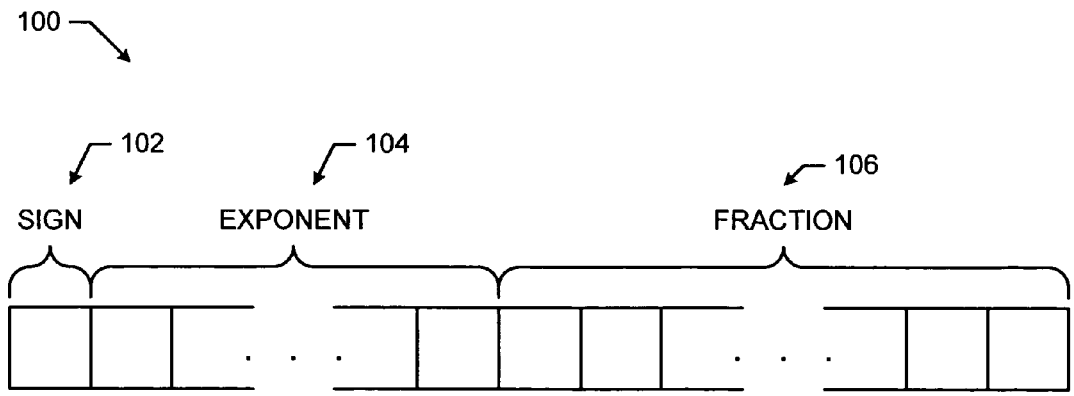
FIG. 1 is an example binary representation of a known floating-point data type known in the prior art.

FIG. 1 is an example binary representation 100 of a known floating-point data type. According to the IEEE Floating-Point Standard 754-1985, the floating-point data type is associated with a 32-bit single precision floating-point data type and a 64-bit double precision floating-point data type. However, it would be apparent to one of ordinary skill in the art that the floating-point data type may be adapted to suit the particular needs of certain applications. Additionally, the floating-point data type may be used to provide a binary representation of decimal values having a relatively large numeric range and relatively precise computational results. In general, the numeric range of a floating-point data type is based on a moving or floating binary point. The moving or floating binary point is based on a set of rules defined by the IEEE Floating-Point Standard 754-1985.

The example binary representation 100 of the floating-point data type showing FIG. 1 includes a sign bit 102, an exponent bitfield (e) 104, and a mantissa bitfield (f) 106. For a 32-bit value, in a single-precision floating-point data type, the sign bit 102 is represented by bit thirty-one, the exponent bitfield 104 is eight bits long and is represented by bits twenty-three through thirty, and the mantissa bitfield 106 is twenty-three bits long and is represented by bits zero through twenty-two. For a 64-bit value, in a double-precision floating-point data type, the sign bit 102 is represented by bit sixty-three, the exponent bitfield 104 is eleven bits long and is represented by bits fifty-two through sixty-two, and the mantissa bitfield 106 is fifty-two bits long and is represented by bits zero through fifty-one.

The floating-point data type also uses a bias value. The bias value of a single-precision floating-point data type is equal to one hundred twenty-seven and the bias value for a double-precision floating-point data type is equal to one-thousand twenty-three. Additionally, the bias value is equal to half of the value of the exponent bitfield 104 minus one $$\left(\text{e.g.,} \frac{2^8}{2} - 1 = 127\right).$$

A numeric conversion of a floating-point encoded value (e.g., the example binary representation 100) involves determining a numeric equivalent value of the floating-point encoded value. A floating-point encoded value may be, for example, any value that is encoded according to the example binary representation 100 of the floating-point data type. Determining the equivalent numeric value of a floating-point encoded value involves a numeric conversion process based on the sign bit 102, the exponent bitfield 104, the mantissa bitfield 106, and an exponent value.

The sign bit 102 specifies the sign of the equivalent numeric value. The exponent bitfield 104 and the mantissa bitfield 106 specify the magnitude and fractional portion of the equivalent numeric value. In particular, the exponent value is determined by subtracting the bias value from the value of the exponent bitfield 104 (i.e., e−bias). In general, the bias value is selected so that positive and negative exponent values can be generated based on the value of the exponent bitfield 104.

The mantissa bitfield (f) 106 represents a fractional or decimal value and is generally associated with a normalized value and a denormalized value. A normalized value includes a leading value of one followed by a binary point (i.e., decimal point) and the value of the mantissa bitfield 106 (i.e., 1.f). A denormalized value includes a leading value of zero followed by a binary point and the value of the mantissa bitfield 106 (i.e., 0.f). The leading value and the binary point are implicit and, thus, are not stored in any of the bit locations of the example binary representation 100 of the floating-point data type of FIG. 1. Floating-point values are typically stored in normalized form, which preserves the precision of the value of the mantissa bitfield 106. The denormalized form is typically used in special cases and does not preserve the full precision of the value of the mantissa bitfield 106.

The numeric conversion of a floating-point encoded value may be performed according to Equation 1 below.

$$V_{FP} = (-1)^{[sign\ bit]} \cdot 2^{e-bias} \cdot (1.f) \quad \text{Equation 1}$$

As shown in Equation 1, the numeric equivalent value of a floating-point encoded value is represented by the variable $V_{FP}$ and may be determined by multiplying the value of the mantissa bitfield 106 by the value of two raised to a power equal to the biased exponent, and multiplying the result by a negative one raised to a power equal to the value of the sign bit 102.

To better understand the numeric conversion of a floating-point encoded value, it is helpful to understand the numeric conversion of the mantissa bitfield 106 (i.e., converting the mantissa bitfield 106 to a numeric equivalent value). Each bit of the mantissa bitfield 106 is associated with a fractional value, which is specified by a power of two value that includes the value of two raised to a power equal to a negative integer $$\left(\text{e.g.,} \ 2^{-1} = \frac{1}{2},\ 2^{-2} = \frac{1}{4},\ \text{etc.}\right)$$

The mantissa bitfield 106 includes a MSB $b_0$ (i.e., the bit closest to the binary point) that is associated with the fractional value $2^{-1}$ and a LSB $b_{M-1}$ (i.e., bit furthest from binary point) that is associated with the fractional value $2^{-M}$, where M is the maximum number of bits in the mantissa bitfield 106. For example, for a single-precision floating-point value, M is equal to twenty-three and for a double-precision floating-point value, M is equal to fifty-two. The numeric equivalent value of the mantissa bitfield 106 may be determined according to Equation 2 below.

$$V_f = b_0 \cdot 2^{-1} + b_1 \cdot 2^{-2} + \ldots + b_{M-2} \cdot 2^{M-1} \cdot b_{M-1} \cdot 2^M \quad \text{Equation 2}$$

As shown in Equation 2 above, the numeric equivalent value of the mantissa bitfield (f) 106 is represented by the variable $V_f$ and may be determined by generating a product for each bit value and its corresponding fractional value, and then determining a sum of the products. If the corresponding bit (e.g., $b_0$) of a fractional value (e.g., $2^{-1}$) is zero, the fractional value is cancelled. If on the other hand, the corresponding bit of a fractional value is one, the fractional value is added to the sum of fractional bits.

As can be appreciated from the foregoing, due to the complexity of determining a numeric equivalent value of a floating-point encoded value, complex hardware and/or a complex software infrastructure is typically needed to perform arithmetic operations based on the floating-point data type.

Figure 2:
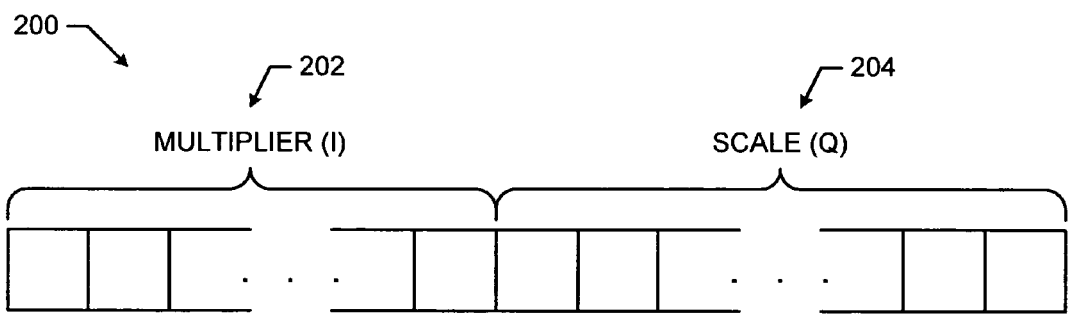
FIG. 2 is an example binary representation of an example scaled-integer data type, according to an embodiment of the disclosed apparatus and methods.

FIG. 2 is an example binary representation 200 of an example scaled-integer data type. In particular, the example scaled-integer data type is based on scaled-integer values and may be used to provide a numeric range that exceeds the numeric range typically provided by the floating-point data type. Additionally, arithmetic operations based on scaled-integer values are relatively less complex than arithmetic operations based on floating-point values. As described in detail below, the properties of the example scaled-integer data type enable arithmetic operations to be implemented using instructions associated with integer arithmetic operations. Arithmetic operations based on the example scaled-integer data type may provide execution speeds and power consumption characteristics that are similar to the execution speeds and power consumption characteristics associated with integer data type operations. Furthermore, arithmetic operations based on the example scaled-integer data type may be implemented in hardware (e.g., the example system 1200 of FIG. 12) and/or software stored on a machine accessible medium (e.g., a computer accessible medium) and executed by a processor system (e.g., the processor system 1310 of FIG. 13). In particular, arithmetic operations based on the example scaled-integer data type may be performed by an integer-based processor such as, for example, a processor of the Intel® XScale® processor family.

Figure 13:
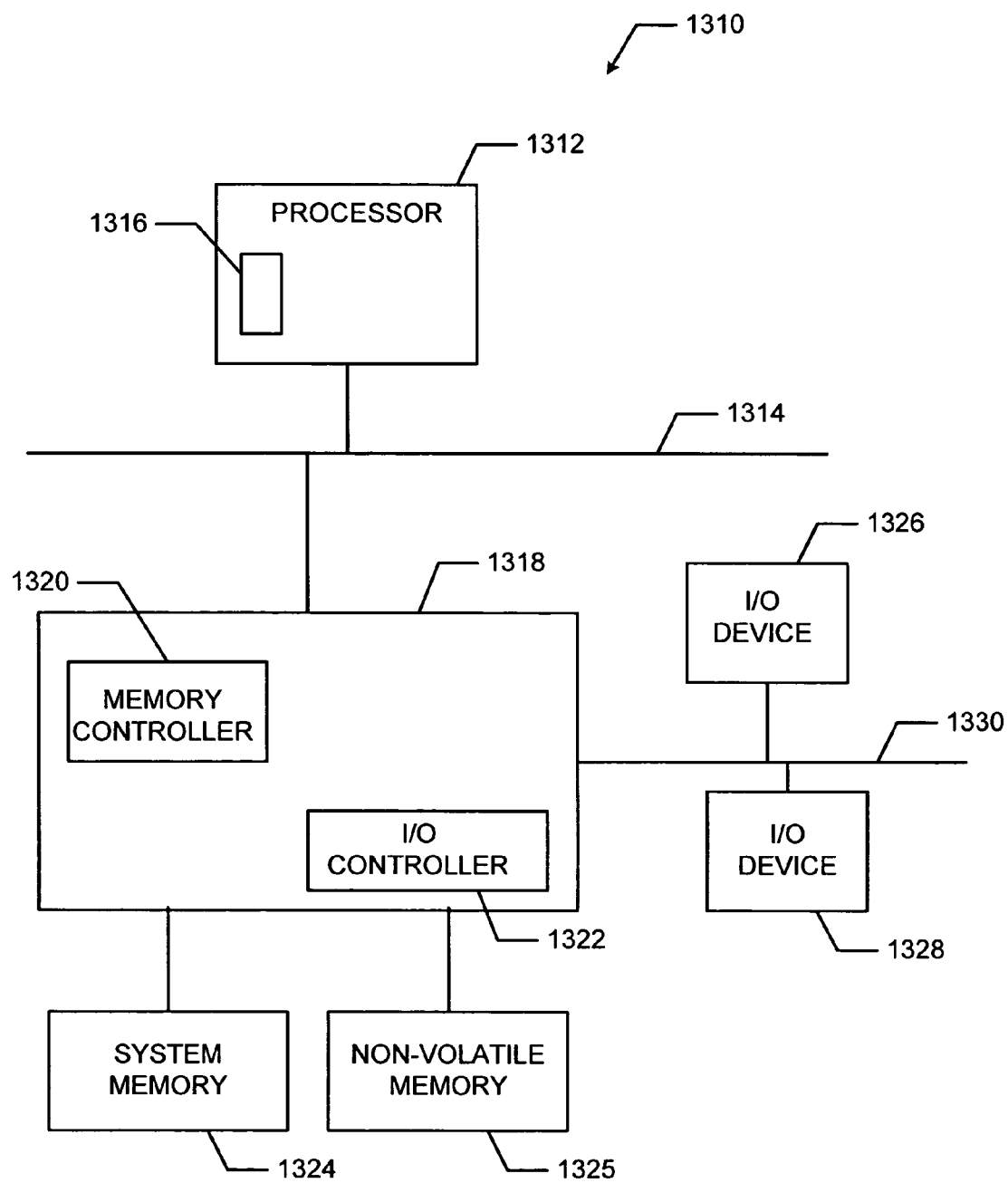
FIG. 13 is a block diagram of an example processor system that may be used to implement the apparatus and methods described herein.

Now turning in detail to FIG. 2, the example binary representation 200 depicts a bit structure or arrangement that may be used to store a scaled-integer value (i.e., a scaled-integer encoded value) in a memory (e.g., the system memory 1324 of FIG. 13). A scaled-integer value may be represented using any desired number of bits and, as shown in the example binary representation 200 of the example scaled-integer data type, includes a multiplier value bitfield 202 in which a multiplier value I may be stored and a scale value bitfield 204 in which a scale value Q may be stored. The multiplier value I and the scale value Q may be integer values having any desired number of bits. The sum of the number of bits used to form the multiplier value bitfield 202 and the scale value bitfield 204 is equal to the total number of bits in a scaled-integer value (I,Q) (i.e., the number of bits in the example binary representation 200).

Although the multiplier value I and the scale value Q may be selected to include any number of bits, the number of bits in the multiplier value I and the scale value Q may be selected to match the capabilities or architecture of the processor on which the example scaled-integer data type is to be implemented. For example, for a 32-bit processor, the multiplier value I and the scale value Q may be selected so that the sum of the multiplier value I and the scale value Q is equal to thirty-two (i.e., I+Q=32). Additionally, for a 32-bit processor, the number of bits in the multiplier value I and the scale value Q may be selected as multiples of eight to simplify arithmetic operations based on the example scaled-integer data type. The bit lengths of the multiplier value I and the scale value Q selected for the example scaled-integer data type may be provided to hardware and/or software to enable interpretation of scaled-integer values during a runtime phase. For example, the bit lengths associated with the example scaled-integer data type may be provided to applications via global variables.

The multiplier value I and the scale value Q may be selected as signed integer values (e.g., I,Q=0, ±1, ±2, ±3, etc.) and may be stored in two's complement form, which enables implementation of two's complement arithmetic during a runtime phase. Additionally, a scaled-integer provides redundancy in representation, which enables a value to be represented using the example binary representation 200 of the example scaled-integer data type in several manners. For example, based on a numeric conversion of a scaled-integer encoded value described in detail in connection with Equation 3 below, the scaled-integer values (i.e., (I,Q) values) (1,0), (2,1), and (4,−2) are equal to each other.

Scaled-integer values are associated with a bias value $\beta$ that is used to determine a compound scale exponent. The compound scale exponent is determined by subtracting the bias value $\beta$ from the scale value Q (i.e., Q−$\beta$) and is used to perform a numeric conversion of a scaled-integer encoded value. In general, the bias value $\beta$ may be selected as a fixed value and may be provided to hardware and/or software using the example scaled-integer data type via, for example, a global variable so that a scaled-integer value may be properly interpreted during a runtime phase.

A numeric conversion of a scaled-integer encoded value may be used to determine a numeric equivalent value of the scaled-integer encoded value and is based on the multiplier value I, the scale value Q, and the bias value $\beta$. More specifically, the numeric equivalent of a scaled-integer value may be determined as set forth in Equation 3 below.

$$V_{SI} = I \cdot 2^{Q-\beta} \qquad \text{Equation 3}$$

As shown in Equation 3, the numeric equivalent value of a scaled-integer value is represented by the variable $V_{SI}$ and may be determined by raising the compound scale exponent (i.e., Q−$\beta$) to the power of two and multiplying the result by the multiplier value I. In general, a numeric value may be encoded as a scaled-integer value by algebraically rearranging Equation 3, selecting a fixed value for the bias $\beta$, and selecting the multiplier value I and the scale value Q to represent the numeric value. After the multiplier value I and the scale value Q are selected, these values may be rounded or truncated to a desired bit length or data width.

The example binary representation 200 of the example scaled-integer data type shows the multiplier value I and the scale value Q as a concatenation of I followed by Q to form a scaled-integer encoded value $X_{SCINT}$ (i.e., $X_{SCINT}=(I,Q)$) as set forth in Equation 4 below. However, the multiplier value I and the scale value Q may also be concatenated as Q followed by I (i.e., $X_{SCINT}=(Q,I)$) as set forth in Equation 5 below.

$$i_{l-1} i_{l-2} \ldots i_0 q_{m-1} q_{m-2} \ldots q_0 \qquad \text{Equation 4}$$

$$q_{m-1} q_{m-2} \ldots q_0 i_{l-1} i_{l-2} \ldots i_0 \qquad \text{Equation 5}$$

As shown in Equations 4 and 5 above, a multiplier bit value i represents the bit values of the multiplier value bitfield 202, a multiplier bit-length value l represents the number of bits in the multiplier bitfield 202, a scale bit value q represents the bit values of the scale value bitfield 204, and a scale bit-length value m represents the number of bits in the scale value bitfield 204.

The numeric range of the multiplier value I and the scale value Q may be determined based on the multiplier bit-length value l and the scale bit-length value m. For example, the numeric range of the multiplier value I may be expressed as $-2^{l-1} \leq I \leq 2^{l-1}-1$ and the numeric range of the scale value Q may be expressed as $-2^{m-1} \leq Q \leq 2^{m-1}-1$. In that case, the maximum scaled-integer value (i.e., the most positive value) and the minimum scaled-integer value (i.e., the most negative value) may be determined according to Equations 6 and 7 below.

$$(I, Q)_{max} = (2^{l-1} - 1) \cdot 2^{2^{m-1}-(1+\beta)} \quad \text{Equation 6}$$

$$(I, Q)_{min} = -2^{l-1} \cdot 2^{2^{m-1}-(1+\beta)} \quad \text{Equation 7}$$

As shown in Equation 6, the term $2^{l-1}-1$ represents a maximum value of the multiplier value I, which is multiplied by the term $2^{2^{m-1}-(1+\beta)}$, where $2^{m-1}-(1+\beta)$ represents a maximum value of the scale value Q. As shown in Equation 7, the term $-2^{l-1}$ represents the minimum multiplier value I, which is a negative value, and which is multiplied by the term $2^{2^{m-1}-(1+\beta)}$. The magnitude of the term $2^{2^{m-1}-(1+\beta)}$ is relatively large because $2^{m-1}-(1+\beta)$ represents the maximum scale value Q. Thus, a minimum scaled-integer value is determined by multiplying a negative value (e.g., $-2^{l-1}$) by a value having a relatively large magnitude (e.g., $2^{2^{m-1}-(1+\beta)}$).

As shown by Equations 6 and 7, the numeric range of the multiplier value I (i.e., $-2^{l-1} \leq I \leq 2^{l-1}-1$), and the numeric range of the scale value Q (i.e., $-2^{m-1} \leq Q \leq 2^{m-1}-1$), the maximum numeric range of scaled-integer values is theoretically unlimited because the scale bit-length value m and multiplier bit-length value l may be selected to be any desired length. However, in practice, when implemented in hardware and/or software, the example scaled-integer data type may be implemented to represent a subset of all possible scaled-integer values. More specifically, the numeric range of the example scaled-integer data type may be implemented to represent a subset of the numeric range of all possible scaled-integer values. For example, the numeric range of the example scaled-integer data type may be implemented based on target platform characteristics, processor capabilities, hardware capabilities, etc. to prevent calculation errors associated with overflow or underflow conditions.

Figure 3:
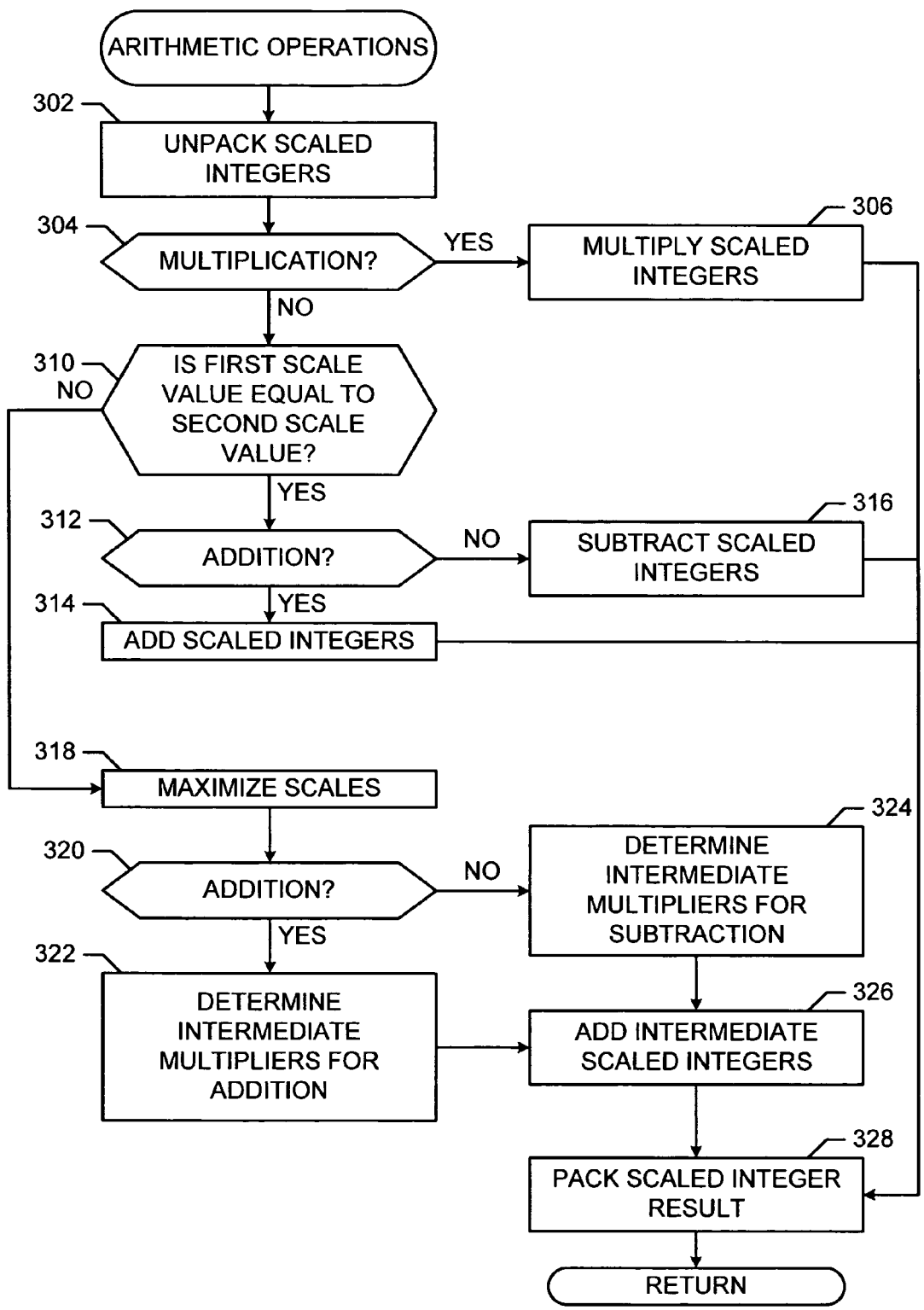
FIG. 3 is a flow diagram of an example manner in which example arithmetic operations may be performed using the example scaled-integer data type described in connection with FIG. 2, according to an embodiment of the disclosed apparatus and methods.

FIG. 3 is a flow diagram of an example manner in which example arithmetic operations may be performed using the example scaled-integer data type described in connection with FIG. 2 above. In particular, the example arithmetic operations may include multiplication operations, addition operations, and subtraction operations. Division operations are not shown explicitly in FIG. 3. However, as described in connection with FIG. 11 below, a division operation may be performed by determining the reciprocal of a scaled-integer value followed by a multiplication operation. The example methods of FIG. 3 may be invoked by requesting an arithmetic operation in response to execution of a machine accessible instruction or a function stored in a memory (e.g., the system memory 1324 of FIG. 13). Furthermore, the example arithmetic operations may be implemented in hardware (e.g., the example system 1200 of FIG. 12) and/or software stored on a machine accessible medium (e.g., computer accessible medium) and executed on a processor system (e.g., the processor system 1310 of FIG. 13). For purposes of clarity, the example arithmetic operations are described based on using variable representations of a first input value $X_{SCINT}$, a second input value $Y_{SCINT}$, and a result value $Z_{SCINT}$.

Initially, the first input value $X_{SCINT}$ and the second input value $Y_{SCINT}$ are unpacked to generate a first scaled-integer value $(I_x, Q_x)$ and a second scaled-integer value $(I_y, Q_y)$ (block 302). The input values $X_{SCINT}$ and $Y_{SCINT}$ may be unpacked by implementing an unpack function or instruction (i.e., $(I_x, Q_x)$=unpack$(X_{SCINT})$) that, when executed, causes a processor (e.g., the processor 1312 of FIG. 13) or hardware (e.g., the example system 1200 of FIG. 12) to separate or parse a first input multiplier value $I_x$ and a first input scale value $Q_x$ from the first input value $X_{SCINT}$ and a second input multiplier value $I_y$ and a second input scale value $Q_y$ from the second input value $Y_{SCINT}$. The input multiplier values $I_x$ and $I_y$ and the input scale values $Q_x$ and $Q_y$ may be stored in, for example, the system memory 1324 (FIG. 13) or register locations in a processor (e.g., the processor 1312 of FIG. 13).

After the input values $X_{SCINT}$ and $Y_{SCINT}$ are unpacked, it is determined if the arithmetic operation to be performed is a multiplication operation (block 304). If it is determined at block 304 that the arithmetic operation to be performed is a multiplication operation, the unpacked input scaled-integer values $(I_x, Q_x)$ and $(I_y, Q_y)$ are multiplied (block 306) based on the input multiplier values $I_x$ and $I_y$ and the input scale values $Q_x$ and $Q_y$ according to Equations 8 and 9 below.

$$I_z = I_x \cdot I_y \quad \text{Equation 8}$$

$$Q_z = Q_x + Q_y - \beta \quad \text{Equation 9}$$

As shown in Equation 8, a multiplier value result $I_z$ is determined by multiplying the first input multiplier value $I_x$ by the second input multiplier value $I_y$. Additionally, a scale value result $Q_z$ is determined by adding the first input scale value $Q_x$ to the second input scale value $Q_y$ and subtracting the bias value $\beta$ from the result.

If it is determined at block 304 that the arithmetic operation to be performed is not a multiplication operation, it is determined if the first input scale value $Q_x$ is equal to the second input scale value $Q_y$ (block 310). If it is determined at block 310 that the first input scale value $Q_x$ is equal to the second input scale value $Q_y$, it is determined if the arithmetic operation to be performed is an addition operation (block 312). If it is determined at block 312, that the arithmetic operation to be performed is an addition operation, the input scaled-integer values $(I_x, Q_x)$ and $(I_y, Q_y)$ are added based on the input multiplier values $I_x$ and $I_y$ and the first input scale value $Q_x$ according to Equations 10 and 11 below (block 314).

$$I_z = I_x + I_y \quad \text{Equation 10}$$

$$Q_z = Q_x \quad \text{Equation 11}$$

As shown in Equation 10, the multiplier value result $I_z$ is determined by adding the first input multiplier value $I_x$ to the second input multiplier value $I_y$. As shown in Equation 11, the scale value result $Q_z$ is set equal to the first input scale value $Q_x$. Alternatively, because the first input scale value $Q_x$ is equal to the second input scale value $Q_y$, the scale value result $Q_z$ may be set equal to the second input scale value $Q_y$ (e.g., $Q_z = Q_y$).

If it is determined at block 312, that the arithmetic operation to be performed is not an addition operation, the second input scaled-integer value $(I_y, Q_y)$ is subtracted from the first input scaled-integer value $(I_x, Q_x)$ based on the input multiplier values $I_x$ and $I_y$ and the first input scale value $Q_x$ according to Equations 12 and 13 below (block 316).

$$I_z = I_x - I_y \qquad \text{Equation 12}$$

$$Q_z = Q_x \qquad \text{Equation 13}$$

As shown in Equation 12, the multiplier value result $I_z$ is determined by subtracting the second input multiplier value $I_y$ from the first input multiplier value $I_x$. As shown in Equation 13, the scale value result $Q_z$ is set equal to the first input scale value $Q_x$. Alternatively, because the first input scale value $Q_x$ is equal to the second input scale value $Q_y$, the scale value result $Q_z$ may be set equal to the second input scale value $Q_y$ (e.g., $Q_z = Q_y$).

If it is determined at block 310 that the first input scale value $Q_x$ is not equal to the second input scale value $Q_y$, a maximum scale value $Q_{max}$ is determined based on the input scale values $Q_x$ and $Q_y$ (block 318). The maximum scale value $Q_{max}$ may be determined by implementing a Q-MAX instruction or function (i.e., $Q_{max} = \max(Q_x, Q_y)$) that, when executed, causes a processor (e.g., the processor 1312 of FIG. 13) or hardware (e.g., the example system 1200 of FIG. 12) to compare the first input scale value $Q_x$ to the second input scale value $Q_y$, determine the greater value of the two, and set the maximum scale value $Q_{max}$ equal to the greater value. For example, if the second input scale value $Q_y$ is greater than the first input scale value $Q_x$, the maximum input scale value $Q_{max}$ is set equal to the second input scale value $Q_y$ (e.g., $Q_{max} = Q_y$).

It is then determined if the arithmetic operation to be performed is an addition operation (block 320). If it is determined at block 320 that the arithmetic operation is an addition operation, a first intermediate multiplier value $I'_x$ and a second intermediate multiplier value $I'_y$ are determined for the addition operation based on the first input multiplier value $I_x$ and the second input multiplier value $I_y$ (block 322). The first intermediate multiplier value $I'_x$ is determined based on the first input multiplier value $I_x$, the maximum scale value $Q_{max}$, and the first input scale value $Q_x$ according to Equation 14 below. The second intermediate multiplier value $I'_y$ is determined based on the second input multiplier value $I_y$, the maximum scale value $Q_{max}$, and the second input scale value $Q_y$ according to Equation 15 below. The brackets '$\lfloor \ldots \rfloor$' denote the 'floor' function, so that $\lfloor x \rfloor$ is a unique integer and $\lfloor x \rfloor \leq x < \lfloor x \rfloor + 1$.

$$I'_x = \left\lfloor \frac{I_x}{2^{Q_{max} - Q_x}} \right\rfloor \qquad \text{Equation 14}$$

$$I'_y = \left\lfloor \frac{I_y}{2^{Q_{max} - Q_y}} \right\rfloor \qquad \text{Equation 15}$$

As shown in Equation 14 above, the first intermediate multiplier value $I'_x$ is equal to the floor function of the first multiplier value $I_x$ divided by two raised to a power equal to the result of the first input scale value $Q_x$ subtracted from the maximum scale value $Q_{max}$. As shown in Equation 15 above, the second intermediate multiplier value $I'_y$ is equal to the floor function of the second intermediate multiplier value $I_y$ divided by two raised to a power equal to the result of the second input scale value $Q_y$ subtracted from the maximum scale value $Q_{max}$. Although the process of block 322 is described as determining the intermediate multiplier values $I'_x$ and $I'_y$, an optimization of this process may be implemented by determining only one of the intermediate multiplier values because as described in connection with block 318 above, $Q_{max}$ is set equal to $Q_x$ or $Q_y$. Therefore, only one of the divisors of Equations 14 and 15 will be equal to a value other than one (i.e., $2^0 = 1$).

If it is determined at block 320, that the arithmetic operation is not an addition operation, a first intermediate multiplier value $I'_x$ and a second intermediate multiplier value $I'_y$ are determined for a subtraction operation based on the first input multiplier value $I_x$ and the second input multiplier value $I_y$ (block 324). The first intermediate multiplier value $I'_x$ is determined according to Equation 14 above. The second intermediate multiplier value $I'_y$ is determined based on the second input multiplier value $I_y$, the maximum scale value $Q_{max}$, and the second input scale value $Q_y$ according to Equation 16 below.

$$I'_y = \left\lfloor \frac{-I_y}{2^{Q_{max} - Q_y}} \right\rfloor \qquad \text{Equation 16}$$

As shown in Equation 16 above, the second intermediate multiplier value $I'_y$ is equal to the floor function of the negative value of the second intermediate multiplier value $I_y$ divided by two raised to a power equal to the result of the second input scale value $Q_y$ subtracted from the maximum scale value $Q_{max}$.

The intermediate multiplier values $I'_x$ and $I'_y$ determined at block 322 or block 324 and the maximum scale value $Q_{max}$ may be used to form a first intermediate scaled-integer value $(I'_x, Q_{max})$ and a second intermediate scaled-integer value $(I'_y, Q_{max})$. The desired arithmetic operation (i.e., an addition operation or a subtraction operation) may then be performed by adding the first intermediate scaled-integer value $(I'_x, Q_{max})$ to the second intermediate scaled-integer value $(I'_y, Q_{max})$ (block 326) based on the intermediate multiplier values $I'_x$ and $I'_y$ determined at block 322 or block 324 and the maximum scale value $Q_{max}$ according to Equation 17 and Equation 18 below.

$$I_z = I'_x + I'_y \qquad \text{Equation 17}$$

$$Q_z = Q_{max} \qquad \text{Equation 18}$$

As shown in Equation 17, the multiplier value result $I_z$ may be determined by adding the first intermediate multiplier value $I'_x$ to the second intermediate multiplier value $I'_y$. In particular, if the arithmetic operation to be performed is an addition operation, the intermediate multiplier values $I'_x$ and $I'_y$ are determined at block 322. On the other hand, if the arithmetic operation to be performed is a subtraction operation, the intermediate multiplier values $I'_x$ and $I'_y$ are determined at block 324. As shown in Equation 18 above, the scale value result $Q_z$ is set equal to the maximum scale value $Q_{max}$.

After the requested arithmetic operation is performed (block 306, block 314, block 316, or block 326), the multiplier value result $I_z$ and the scale value result $Q_z$ are packed to generate the result value $Z_{SCINT}$ (block 328). The result value $Z_{SCINT}$ may be generated by implementing a pack instruction or function (e.g., $Z_{SCINT} = \text{pack}(I'_z, Q_z)$) that, when executed, causes a processor (e.g., the processor 1312 of FIG. 13) and/or hardware (e.g., the example system 1200 of FIG. 12) to, for example, concatenate the multiplier value result $I_z$ and the scale value result $Q_z$ according to Equation 4 or Equation 5 above and store the result in the result value $Z_{SCINT}$.

Figure 4:
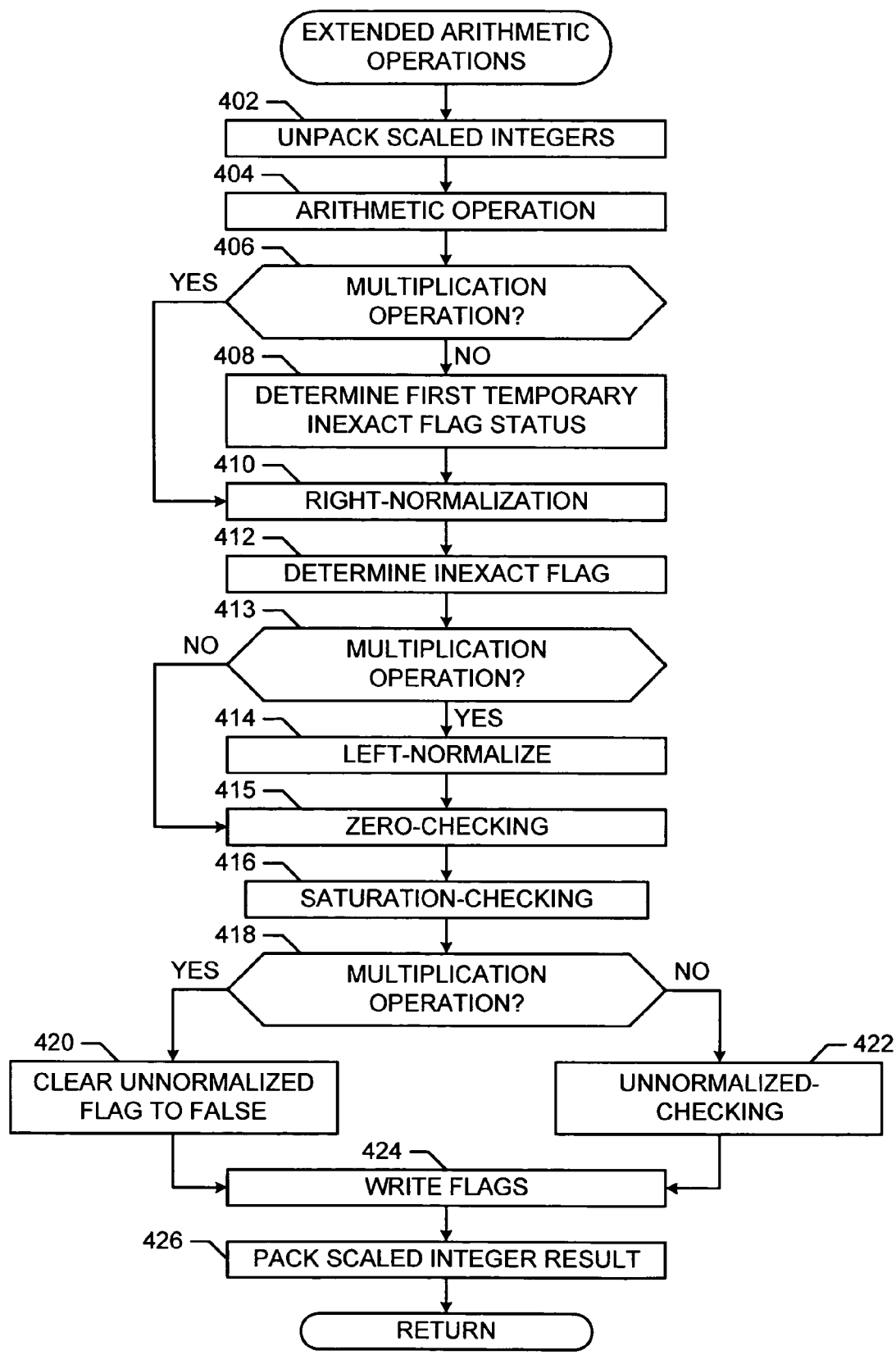
FIG. 4 is a flow diagram depicting an example manner in which example extended arithmetic operations may be performed using the example scaled-integer data type described in connection with FIG. 2, according to an embodiment of the disclosed apparatus and methods.

FIG. 4 is a flow diagram depicting an example manner in which example extended arithmetic operations may be performed using the example scaled-integer data type described in connection with FIG. 2 above. The example extended arithmetic operations may be used to analyze and/or modify the numeric characteristics of scaled-integer values resulting from multiplication, addition, or subtraction operations performed, for example, as described in connection with FIG. 3. Additionally, as described in greater detail below, the example extended arithmetic operations may include operations to update status flags based on the numeric characteristics of scaled-integer values.

Before proceeding with the detailed description of the example extended arithmetic operations it should be recognized that the example status operations of FIGS. 5-9 in combination with the example extended arithmetic operations of FIG. 4 may be used to update status flags that include an inexact flag (flag_i), an unnormalized flag (flag_u), a zero flag (flag_z), a negative flag (flag_n), and a saturation flag (flag_q). An overflow flag (flag_v) and a carry flag (flag_c) may also be implemented by repeatedly clearing the overflow flag (i.e., flag_v=false) and setting the status of the carry flag to the opposite or complementary status of the negative flag (i.e., flag_c=¬(flag_n)).

By way of example, the status flags are described with respect to the results of arithmetic operations (e.g., the example arithmetic operations of FIG. 3) and status operations (e.g., the example status operations of FIGS. 5-9). Additionally, it should be understood that a multiplier value I result and scale value Q result of an arithmetic operation or a status operation may not be an exact result (i.e., a theoretical mathematical result). For example, in Equations 14 or 15 above, if bits are lost while determining the intermediate multiplier values, the results of the desired arithmetic operation will not be exact.

The inexact flag (flag_i) may be set if the result of an arithmetic operation has been modified or does not equal the corresponding theoretical mathematical result (i.e., an inexact result has been returned). For example, a status operation (e.g., the right-normalization operation 600 of FIG. 6) may be used to modify the result of an arithmetic operation so that the result of the status operation is not equal to the result of the arithmetic operation. In another example, the inexact flag may be set when operations associated with example arithmetic operations such as, for example, the max($Q_1,Q_2$) function described in connection with FIG. 3 above, modify (e.g., truncate, round, etc.) input values and generate results that are not equal to the corresponding theoretical mathematical evaluations of the original input values.

The unnormalized flag (flag_u) may be cleared to false if an arithmetic operation or a status operation returns a multiplier value I that is in the range $2^{l-2} \leq I \leq 2^{l-1}-1$ or $-2^{l-1} \leq I \leq -2^{l-2}-1$. The zero flag (flag_z) may be set to true if the value of the result of an arithmetic operation or a status operation is equal to zero. The negative flag (flag_n) may be set to true if the result of an arithmetic operation or a status operation is equal to a negative value.

The example extended arithmetic operations may also be used in combination with arithmetic operations such as the example arithmetic operations of FIG. 3. When used in combination with the example arithmetic operations, the example extended arithmetic operations are based on the first input value $X_{SCINT}$, the second input value $Y_{SCINT}$, and the result value $Z_{SCINT}$. The example extended arithmetic operations may be implemented in hardware (e.g., the example system 1200 of FIG. 12) and/or software stored on a machine accessible medium (e.g., computer accessible medium) and executed on a processor system (e.g., the processor system 1310 of FIG. 13).

Initially, the input values $X_{SCINT}$ and $Y_{SCINT}$ are unpacked (block 402). In particular, in one example, the first input value $X_{SCINT}$, the second input value $Y_{SCINT}$, and the result value $Z_{SCINT}$ are unpacked by separating or parsing the multiplier values $I_x$, $I_y$, and $I_z$ and the scale values $Q_x$, $Q_y$, and $Q_z$. A multiplication operation, addition operation, or subtraction operation may then be performed using the example arithmetic operations of FIG. 3 (block 404) and the results are stored in the multiplier value result $I_z$ and the scale value result $Q_z$. It is then determined if the arithmetic operation performed at block 404 is a multiplication operation (block 406).

If it is determined at block 406 that the arithmetic operation performed at block 404 is not a multiplication operation, the status of a first temporary inexact flag (flag_$i_{t1}$) is determined (block 408). The status determination at block 408 may be based on the multiplier values $I_x$, $I_y$, and $I_z$, the scale values $Q_x$, $Q_y$, and $Q_z$, the intermediate multiplier values $I'_x$ and $I'_y$ determined at block 322 or block 324 of FIG. 3, and the maximum scale value $Q_{max}$ determined at block 318 of FIG. 3. The first temporary inexact flag is set to true if either of the conditions set forth in Equations 19 and 20 below is true.

$$I'_x \cdot 2^{Q_{max}-Q_x} \neq I_x \qquad \text{Equation 19}$$

$$I'_y \cdot 2^{Q_{max}-Q_y} \neq I_y \qquad \text{Equation 20}$$

The condition set forth in Equation 19 provides that the first intermediate multiplier value $I'_x$ multiplied by two raised to a power equal to the first input scale value $Q_x$ subtracted from the maximum scale value $Q_{max}$ is not equal to the first input multiplier value $I_x$. The condition set forth in Equation 20 provides that the second intermediate multiplier value $I'_y$ multiplied by two raised to a power equal to the second input scale value $Q_y$ subtracted from the maximum scale value $Q_{max}$ is not equal to the second input multiplier value $I_y$. If either of the conditions set forth in Equations 19 and 20 above is true, the first temporary inexact flag is set to true.

After the status of the first temporary inexact flag is determined (block 408) or if it is determined at block 406 that the arithmetic operation performed at block 404 is a multiplication operation, a right-normalization operation is performed based on the multiplier value result $I_z$ and the scale value result $Q_z$ (block 410). The right-normalization operation performed at block 410 may be implemented based on the example right-normalization operation 600 described in connection with FIG. 6 below. In general, the right-normalization operation performed at block 406 may be used to right-normalize a multiplier value I (e.g., the multiplier value result $I_z$) and a scale value Q (e.g., the scale value result $Q_z$). For example, if the multiplier value result $I_z$ overflows the data format of the example scaled-integer data type (i.e., overflows the number of bits of the example binary representation 200 of FIG. 2), the right-normalization operation performed at block 406 may be used to right-normalize the multiplier value result $I_z$ and recover the overflowed bits.

After the right-normalization operation is performed (block 410), the status of the inexact flag (flag_i) is determined based on the first temporary inexact flag (flag_$i_{t1}$) and/or the second temporary inexact flag (flag_$i_{t2}$) (block 412). If the arithmetic operation performed at block 404 is a multiplication operation, the status of the inexact flag is set equal to the status of the second temporary inexact flag. However, if the arithmetic operation performed at block 404 is an addition or subtraction operation, the status of the inexact flag is determined by logical OR-ing the first temporary inexact flag and the second temporary inexact flag (i.e., flag_i=flag_$i_{t1}$ or flag_$i_{t2}$).

It is then determined if the arithmetic operation performed at block 404 is a multiplication operation (block 413). If it is determined at block 413 that the arithmetic operation performed at block 404 is a multiplication operation, a left-normalization operation is performed based on the multiplier value result $I_z$ and the scale value result $Q_z$ (block 414). The left-normalization operation may be implemented by using the example left-normalization operation 700 described in connection with FIG. 7. In general, the left-normalization operation performed at block 414 may be used to left-normalize or maximize the multiplier value result $I_z$ and the scale value $Q_z$ based on the magnitude of the multiplier value result $I_z$. For example, if the magnitude of the multiplier value result $I_z$ is too small (e.g., relatively close to zero), the left-normalization operation performed at block 414 may be used to increase the magnitude.

On the other hand, if it is determined at block 413 that the arithmetic operation performed at block 404 is not a multiplication operation, a zero-checking operation is performed (block 415). The zero-checking operation performed at block 415 may be implemented by the example zero-checking operation 500 described in connection with FIG. 5 below. The zero-checking operation may be used to modify the multiplier value result $I_z$ and the scale value result $Q_z$ and update the zero flag and the negative flag based on the multiplier value result $I_z$ and the inexact flag.

A saturation-checking operation is then performed (block 416). The saturation-checking operation of block 416 may be implemented by using the example saturation-checking operation 800 described in connection with FIG. 8 below. In general, the saturation-checking operation performed at block 416 may be performed based on the multiplier value result $I_z$ and the scale value result $Q_z$ and may be used to clip the multiplier value result $I_z$ and the scale value result $Q_z$ to keep them within a desired numeric range.

It is then determined if the arithmetic operation performed at block 404 is a multiplication operation (block 418). If it is determined at block 418 that the arithmetic operation performed at block 404 is a multiplication operation, the unnormalized flag is cleared to false (block 420). However, if it is determined at block 418 that the arithmetic operation performed at block 404 is not a multiplication operation, an unnormalized-checking operation is performed (block 422). The unnormalized-checking operation of block 422 may be implemented by using the example unnormalized-checking operation 900, which may be used to update the status of the unnormalized flag based on the multiplier value result $I_z$ as described in connection with FIG. 9 below.

The status flags are then written to, for example, a status flag register (block 424) and the multiplier value result $I_z$ and the scale value result $Q_z$ are packed into the result value $Z_{SCINT}$ (block 426).

FIGS. 5-9 are flow diagrams depicting example manners of implementing the example status operations described in connection with FIG. 4 above. In general, the example status operations may be used to update status flags (e.g., a zero flag, a negative flag, etc.) of a processor (e.g., the processor 1312 of FIG. 13) and/or hardware (e.g., the example system 1200 of FIG. 12). Additionally, the example status operations may be used to modify scaled-integer values (I,Q) based on numeric range limits and/or numeric conditions (e.g., zero conditions, negative conditions, etc.). As described above in connection with FIG. 2, when implemented in hardware and/or software, platform-based limits may be imposed on the numeric range of the example scaled-integer data type. The example status operations of FIGS. 5-9 are based on a multiplier value numeric range of $I_{min} \leq I \leq I_{max}$ and a scale value numeric range of $Q_{min} \leq Q \leq Q_{max}$, where $$I_{max}=2^{l-1}-1$$

$$I_{min}=-2^{l-1}$$

$$Q_{max}=2^{m-1}-1$$

$$Q_{min}=0.$$

In this manner, the numeric range of the multiplier value I includes signed-integer values and the numeric range of the scale value Q includes unsigned integer values (e.g., non-negative values). The example status operations of FIGS. 5-9 may be implemented in hardware (e.g., the example system 1200 of FIG. 12) and/or software stored on a machine accessible medium (e.g., computer accessible medium) and executed on a processor system (e.g., the processor system 1310 of FIG. 13). Furthermore, each status operation may be performed by executing an instruction or a function stored in a memory (e.g., the system memory 1324 of FIG. 13) that and configures, for example, the processor 1312 or the example system 1200 to perform the status operation.

Figure 5:
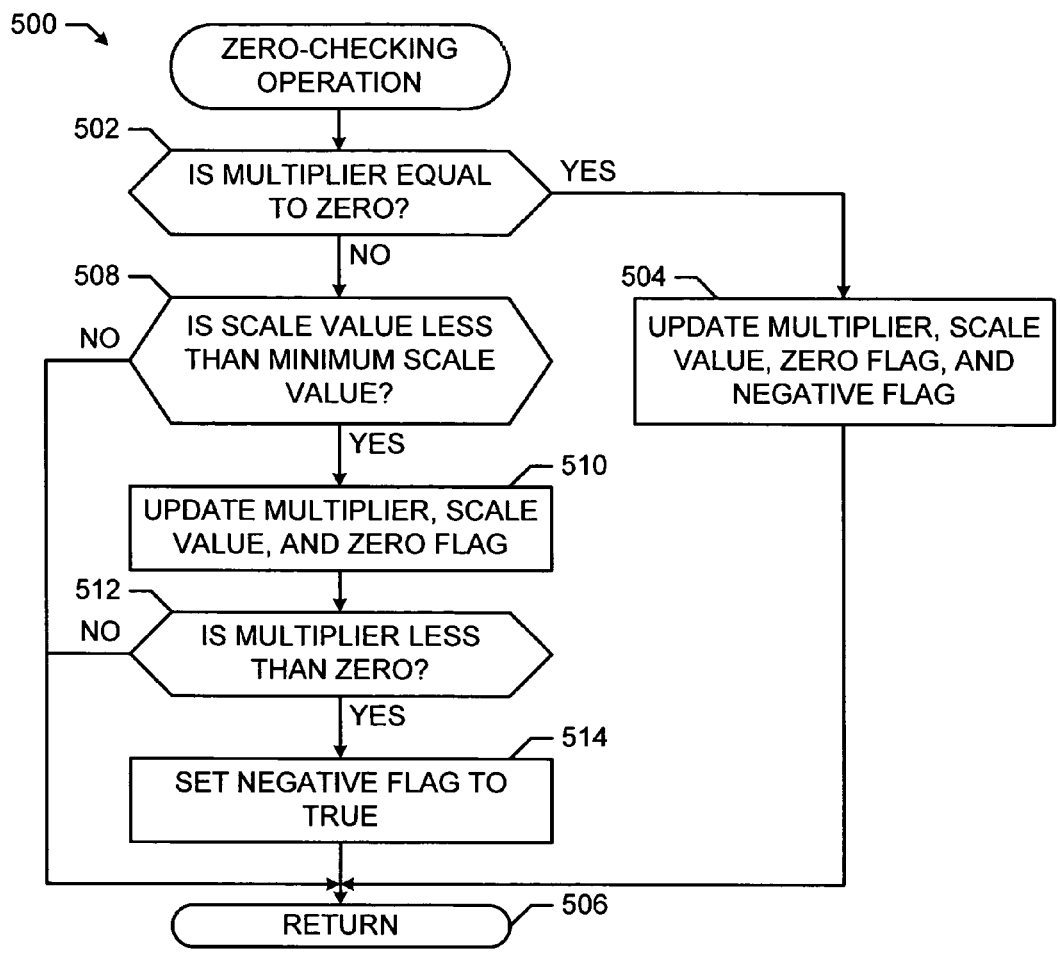
FIGS. 5-9 are flow diagrams of example manners in which the example status operations described in connection with FIG. 4 may be performed using the example scaled-integer data type described in connection with FIG. 2, according to an embodiment of the disclosed apparatus and methods.

Now turning to FIG. 5, a flow diagram depicts an example zero-checking operation 500 based on the example scaled-integer data type described in connection with FIG. 2 above. The example zero-checking operation 500 may be used to modify the multiplier value I and the scale value Q based on the multiplier value I. Additionally, the example zero-checking operation 500 may be used to update the zero flag and the negative flag based on the multiplier value I and the inexact flag. The example zero-checking operation 500 may be performed by implementing a check-zero instruction or function (e.g., ($I_{result}$, $Q_{result}$, flag_z, flag_n)=check_zero (I,Q, flag_i)) that, when executed, causes a processor (e.g., the processor 1312 of FIG. 13) and/or hardware (e.g., the example system 1200 of FIG. 12) to perform the example zero-checking operation 500 based on the multiplier value I, the scale value Q, the inexact flag, the zero flag, and the negative flag.

Initially, a zero test is performed to determine if the multiplier value I is equal to zero (block 502). If it is determined at block 502 that the multiplier value I is equal to zero, the multiplier value I, the scale value Q, the zero flag, and the negative flag are updated (block 504). In particular, the multiplier value I is set equal to zero, the scale value Q is set equal to the minimum scale value $Q_{min}$ defined by the numeric range of the example scaled-integer data type, the zero flag is set equal to the negated value of the inexact flag, and the negative flag is set equal to false. The multiplier value I, the scale value Q, the zero flag, and the negative flag are then returned (block 506). If it is determined at block 502 that the multiplier value I is not equal to zero, a comparison is performed to determine if the scale value Q is less than the minimum scale value $Q_{min}$ (block 508).

If it is determined at block 508 that the scale value is not less than the minimum scale value $Q_{min}$, the multiplier value I, the scale value Q, the zero flag, and the negative flag are unchanged and then returned (block 506). However, if it is determined at block 508 that the scale value Q is less than the minimum scale value $Q_{min}$, the multiplier value I, the scale value Q, and the zero flag are updated (block 510). In particular, the multiplier value I is set equal to zero, the scale value Q is set equal to the minimum scale value $Q_{min}$, and the zero flag is cleared to false.

A comparison is then performed to determine if the multiplier value I is less than zero (block 512). If it is determined at block 512 that the multiplier value I is less than zero, the negative flag is set to true (block 514). After the negative flag is set to true (block 514), or if it is determined at block 512 that the multiplier value I is not less than zero and the negative flag is unchanged, the multiplier value I, the scale value Q, the zero flag, and the negative flag are returned (block 506).

Figure 6:
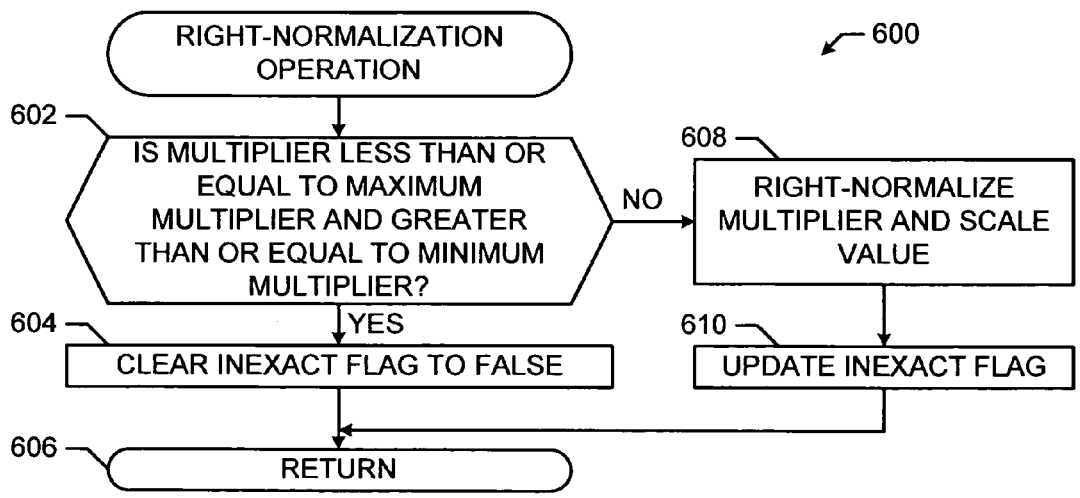

FIG. 6 is a flow diagram that depicts an example right-normalization operation 600 that may be used with the example extended arithmetic operations described in connection with FIG. 4 above. The example right-normalization operation 600 may be used to right-normalize the multiplier value I and the scale value Q and to update the inexact flag. The example right-normalization operation 600 may be performed by implementing a right-normalization instruction or function (e.g., ($I_{result}$, $Q_{result}$, flag_i)=rnorm(I,Q)) that, when executed, causes a processor (e.g., the processor 1312 of FIG. 13) and/or hardware (e.g., the example system 1200 of FIG. 12) to perform the example right-normalization operation 600 based on the multiplier value I, the scale value Q, and the inexact flag.

Initially, a comparison is performed to determine if the multiplier value I is less than or equal to the maximum multiplier value $I_{max}$ and greater than or equal to the minimum multiplier value $I_{min}$ (i.e., $I_{min} \leq I \leq I_{max}$) (block 602). If it is determined at block 602 that the multiplier value I is less than or equal to the maximum multiplier value $I_{max}$ and greater than or equal to the minimum multiplier value $I_{min}$, the multiplier value I and the scale value Q are not changed. The inexact flag is then set to false (i.e., cleared to zero) (block 604) and the scaled-integer value (I,Q) and the inexact flag are returned (block 606).

If it is determined at block 602 that the multiplier value I is not less than or equal to the maximum multiplier value $I_{max}$ or is not greater than or equal to the minimum multiplier value $I_{min}$, the multiplier value I and the scale value Q are right-normalized to determine a right-normalized multiplier value $I_{right}$ and a right-normalized scale value $Q_{right}$ (block 608). The multiplier value I and the scale value Q are right-normalized based on a non-negative integer value k (i.e., k≧0) that is selected to satisfy the numeric range conditions of Equations 21 or 22 below. Additionally, the right-normalized multiplier value $I_{right}$ and the right-normalized scale value $Q_{right}$ are determined according to Equations 23 and 24 below.

$$I_{min} \leq \frac{I}{2^k} \leq \left(\frac{I_{min}}{2} - 1\right) \quad \text{Equation 21}$$

$$\left(\frac{I_{max}+1}{2}\right) \leq \frac{I}{2^k} \leq I_{max} \quad \text{Equation 22}$$

$$I_{right} = \left\lfloor \frac{I}{2^k} \right\rfloor \quad \text{Equation 23}$$

$$Q_{right} = Q + k \quad \text{Equation 24}$$

The non-negative integer value k is selected according to the condition of Equation 21 or the condition of Equation 22. Additionally, as shown in Equations 23 and 24, the right-normalized multiplier value $I_{right}$ and the right-normalized scale value $Q_{right}$ are based on the non-negative integer value k. As shown in Equation 23, the right-normalized multiplier value $I_{right}$ is determined by the floor function of the multiplier value I divided by two raised to a power equal the non-negative integer value k. As shown in Equation 24, the right-normalized scale value $Q_{right}$ is determined by adding the scale value Q to the non-negative integer value k.

The inexact flag is updated based on the right-normalized multiplier value $I_{right}$ (block 610). In particular, the inexact flag is cleared to false if the product of the right-normalized multiplier value $I_{right}$ and two raised to a power equal to the non-negative integer value k (i.e., $2^k$) is equal to the multiplier value I (i.e., $I_{right} \cdot 2^k = I$?), otherwise the inexact flag is unchanged. After the inexact flag has been updated at block 610, the right-normalized scaled-integer value ($I_{right}$, $Q_{right}$) and the inexact flag are returned (block 606).

Figure 7:
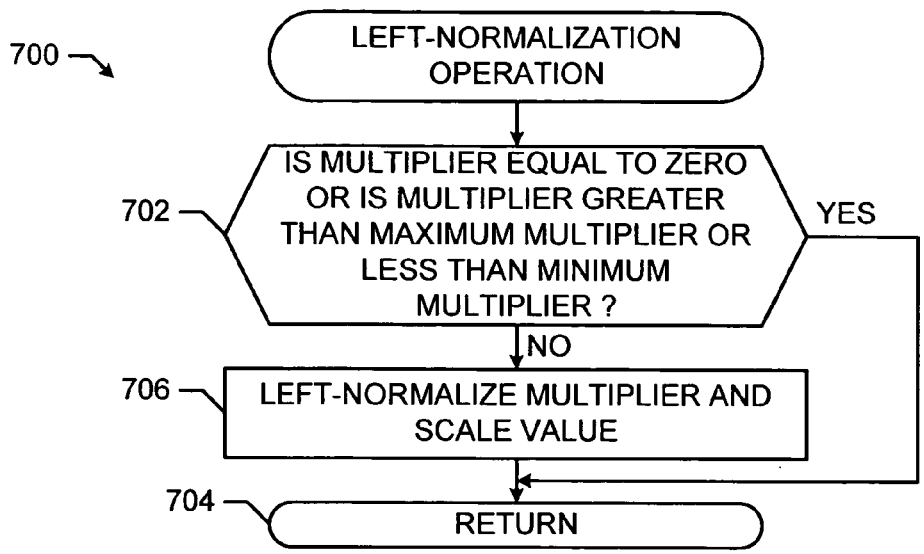

FIG. 7 is a flow diagram of an example left-normalization operation 700 that may be used with the example extended arithmetic operations described in connection with FIG. 4 above. The example left-normalization operation 700 may be used to left-normalize or maximize the multiplier value I and the scale value Q when the magnitude of the multiplier value I is relatively small or equal to zero. In this manner, a relatively small or zero value is not returned. The example left-normalization operation 700 may be performed by implementing a left-normalize instruction or function (e.g., ($I_{result}$, $Q_{result}$)=lnorm(I,Q)) that, when executed, causes a processor (e.g., the processor 1312 of FIG. 13) and/or hardware (e.g., the example system 1200 of FIG. 12) to perform the example left-normalization operation 700 based on the multiplier value I and the scale value Q.

In the example of FIG. 7, it is first determined if the multiplier value I is equal to zero (i.e., I=0?) or greater than the maximum multiplier value $I_{max}$ or less than the minimum multiplier value $I_{min}$ (i.e., $I > I_{max}$ or $I < I_{min}$) (block 702). If it is determined at block 702 that the multiplier value I is equal to zero or greater than the maximum multiplier value $I_{max}$ or less than the minimum multiplier value $I_{min}$, the multiplier value I and the scale value Q are left unchanged. The scaled-integer value (I,Q) is then returned (block 704).

If it is determined at block 702 that the multiplier value I is not equal to zero and is less than or equal to the maximum multiplier value $I_{max}$ and greater than or equal to the minimum multiplier value $I_{min}$, the multiplier value I and the scale value Q are left-normalized (block 706). The multiplier value I and the scale value Q are left-normalized to generate a left-normalized multiplier value $I_{left}$ and a left-normalized scale value $Q_{left}$ by selecting a non-negative integer value k (i.e., k<0). More specifically, the non-negative integer value k is selected according to Equation 25 or Equation 26 below. Additionally, the left-normalized multiplier value $I_{left}$ and the left-normalized scale value $Q_{left}$ are determined as set forth in Equations 27 and 28 below.

$$I_{min} \le I_1 \cdot 2^k \le \left(\frac{I_{min}}{2}\right) - 1 \quad \text{Equation 25}$$

$$\left(\frac{I_{max}+1}{2}\right) \le I_1 \cdot 2^k \le I_{max} \quad \text{Equation 26}$$

$$I_{left} = I \cdot 2^k \quad \text{Equation 27}$$

$$Q_{left} = Q - k \quad \text{Equation 28}$$

As shown in Equation 25, the non-negative integer value k may be selected based on a numeric range associated with the minimum multiplier value $I_{min}$. Alternatively, as shown in Equation 26, the non-negative integer value k may be selected based on a numeric range associated with the maximum multiplier value $I_{max}$. As shown in Equation 27, the left-normalized multiplier value $I_{left}$ is determined by multiplying the multiplier value I by two raised to a power equal to the non-negative integer value k. As shown in Equation 28, the left-normalized scale value $Q_{left}$ is determined by subtracting the non-negative integer value k from the scale value Q. The left-normalized scaled-integer value ($I_{left}$, $Q_{left}$) is then returned (block 704).

Figure 8:
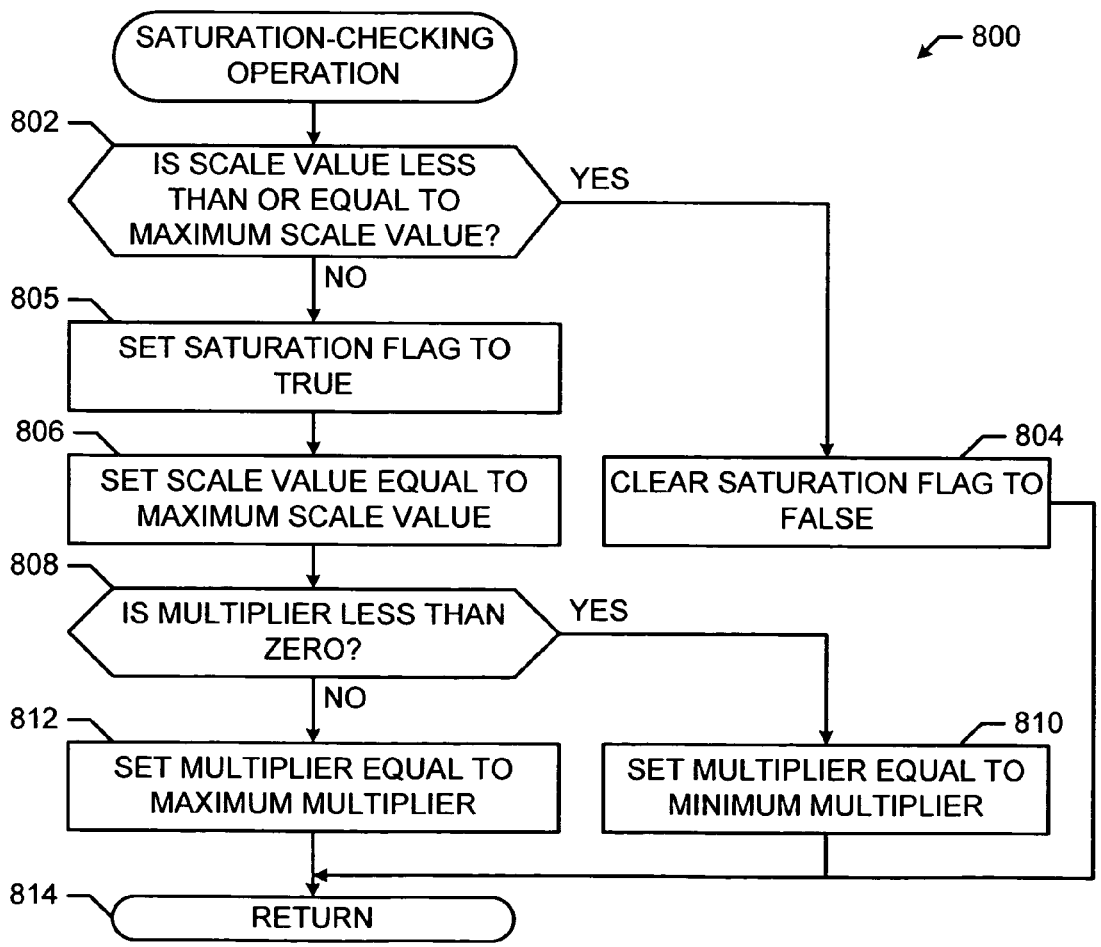

FIG. 8 is a flow diagram that depicts an example saturation-checking operation 800 that may be used with the example extended arithmetic operations described in connection with FIG. 4 above. The example saturation-checking operation 800 may be used to determine if the multiplier value I and/or the scale value Q are out-of-range or saturated by comparing the numeric range limit values (e.g. $Q_{max}$, $I_{max}$, etc.) with the multiplier value I and the scale value Q. The multiplier value I or the scale value Q may be clipped (e.g., set to the numeric range limit values) if they are out-of-range of the numeric range limit values. The example saturation-checking operation 800 may also be used to update the status of the saturation flag based on the multiplier value I and the scale value Q.

The example saturation-checking operation 800 may be performed by implementing a saturation-check or clip instruction or function (e.g., ($I_{result}$, $Q_{result}$)=clip_Q(I,Q)) that, when executed, causes a processor (e.g., the processor 1312 of FIG. 13) and/or hardware (e.g., the example system 1200 of FIG. 12) to perform the example saturation-checking operation 800 comparisons based on the multiplier value I, the scale value Q, and the saturation flag.

A comparison is performed based on the scale value Q and the maximum scale value $Q_{max}$ to determine if the scale value Q is less than or equal to the maximum scale value $Q_{max}$ (block 802). If it is determined at block 802 that the scale value Q is less than or equal to the maximum scale value $Q_{max}$, the saturation flag is cleared to false (block 804). However, if it is determined at block 802 that the scale value Q is not less than or equal to the maximum scale value $Q_{max}$, the saturation flag is set to true (block 805) and the scale value Q is set equal to the maximum scale value $Q_{max}$ (i.e., Q=$Q_{max}$) (block 806).

After the saturation flag is cleared (block 804) or after the scale value Q is set equal to the maximum scale value $Q_{max}$, a zero-test is performed based on the multiplier value I to determine if the multiplier value I is less than zero (i.e., I<0?) (block 808). If it is determined at block 808 that the multiplier value I is less than zero, the multiplier value I is set equal to the minimum multiplier value $I_{min}$ (i.e., I=$I_{min}$) (block 810). However, if it is determined at block 808 that the multiplier value I is not less than zero, the multiplier value I is set equal to the maximum multiplier value $I_{max}$ (i.e., I=$I_{max}$) (block 812). After the saturation flag is cleared to false at block 804, the multiplier value I is set to $I_{min}$ at block 810, or the multiplier value I is set equal to the maximum multiplier value $I_{max}$ (i.e., I=$I_{max}$) at block 812, the scaled-integer value (I,Q) and the saturation flag are returned (block 814).

Figure 9:
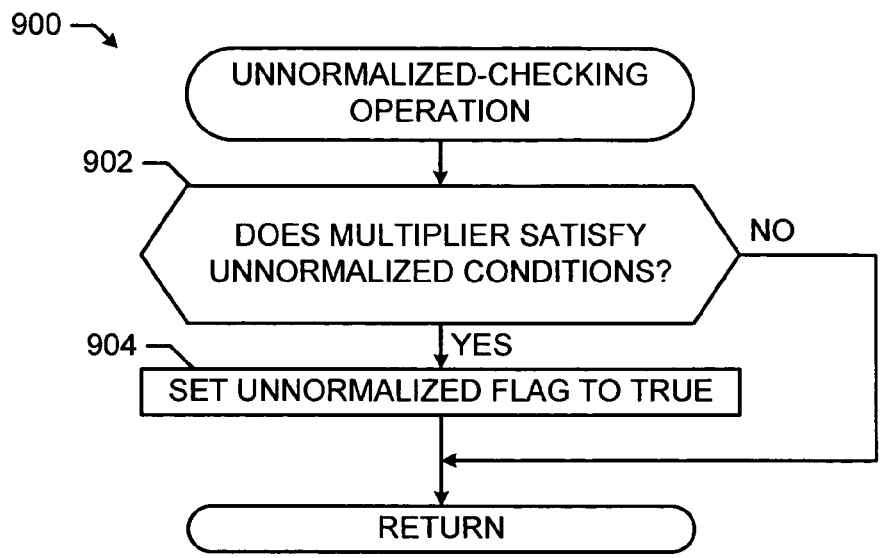

FIG. 9 is a flow diagram that depicts an example unnormalized-checking operation 900 that may be used with the example extended arithmetic operations described in connection with FIG. 4 above. The example unnormalized-checking operation 900 may be used to determine if the multiplier value I is an unnormalized value. In general, unnormalized values are values that are not within a specified normalized numeric range as described below. Additionally, the example unnormalized-checking operation 900 may be used to update the status of the unnormalized flag based on the multiplier value I.

The example unnormalized-checking operation 900 may be performed by implementing a check-unnormalized instruction or function (e.g., (flag_u)=check_unnorm(I)) that, when executed, causes a processor (e.g., the processor 1312 of FIG. 13) and/or hardware (e.g., the example system 1200 of FIG. 12) to perform comparisons based on the multiplier value I and update the status of the unnormalized flag.

Comparisons based on the multiplier value I and a numeric range condition are performed to determine if the multiplier value I is an unnormalized value (block 902). In particular, the numeric range condition is set forth in Equation 29 below.

$$\frac{I_{min}+1}{2} \le I < \left(\frac{I_{max}+1}{2}\right) \quad \text{Equation 29}$$

If it is determined at block 902 that the multiplier value I is within the numeric range condition based on $I_{min}$ and $I_{max}$ as set forth in Equation 29, the unnormalized flag is set to true (block 904). However, if it is determined at block 902 that the multiplier value I does not satisfy the numeric range condition set forth in Equation 29, the unnormalized flag is unchanged.

Figure 10:
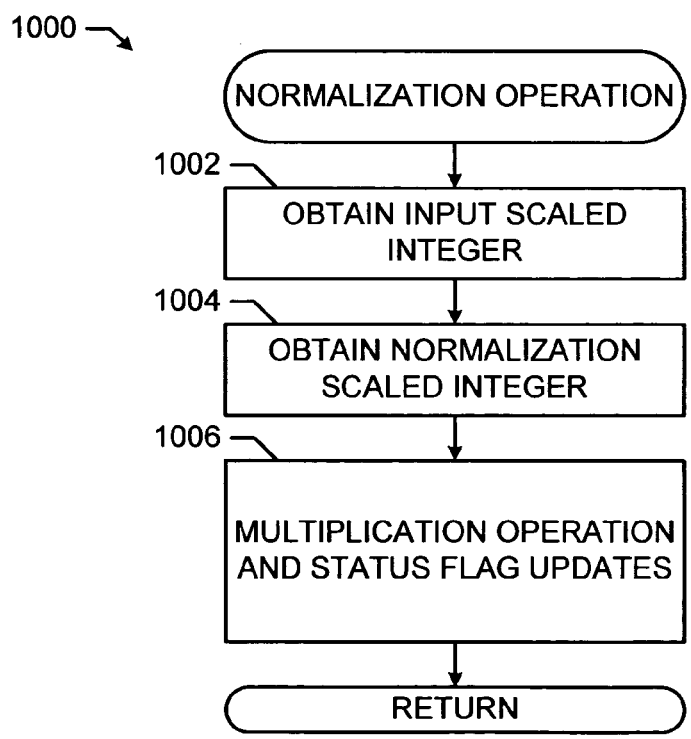
FIG. 10 is a flow diagram depicting an example manner in which a normalization operation may be performed using the example scaled-integer data type described in connection with FIG. 2, according to an embodiment of the disclosed apparatus and methods.

FIG. 10 is a flow diagram depicting an example manner in which a normalization operation may be performed using the example scaled-integer data type described in connection with FIG. 2 above. The normalization operation may be used to ensure that a scaled-integer value is within a desired range of values of the example scaled-integer data type as set forth by, for example, the multiplier value numeric range of $2^{i-2} \le I \le 2^{i-1}-1$ or $-2^{i-1} \le I \le -2^{i-2}-1$, the scale value numeric range of $Q_{min} \le Q \le Q_{max}$, and/or the numeric conditions of the example status operations of FIGS. 5-9. The normalization operation may be implemented in hardware (e.g., the example system 1200 of FIG. 12) and/or software stored on a machine accessible medium and executed on a processor system (e.g., the processor system 1310 of FIG. 13).

The normalization operation may be implemented by using the example extended arithmetic operations of FIG. 4 to perform a multiplication operation based on a normalization value $N_{SCINT}$ equal to one and an input value $X_{SCINT}$. In this manner, the input value $X_{SCINT}$ is not modified by the multiplication operation and/or the example status operations of FIGS. 5-9 as implemented in the example extended arithmetic operations. Additionally, the example normalization operation 1000 may be used to update status flags (e.g., the status flags described in connection with FIG. 4 above) based on the input value $X_{SCINT}$.

The input value $X_{SCINT}$ is obtained (block 1002) and the normalization value $N_{SCINT}$ is obtained (block 1004). The input value $X_{SCINT}$ may be any desired scaled-integer value of the example scaled-integer data type. The normalization value $N_{SCINT}$ is generally selected to have a multiplier value $I_N$ equal to one and a scale value $Q_N$ equal to the bias value $\beta$ of the input value $X_{SCINT}$ to determine a normalization value $N_{SCINT}=(1, \beta)$ (i.e., $N_{SCINT}=1.0$).

The input value $X_{SCINT}$ and the normalization value $N_{SCINT}$ are passed to a multiplication operation (block 1006). In particular, the multiplication operation includes one or more of the example status operations of FIGS. 5-9 and may be substantially similar or identical to the multiplication operation of the example extended arithmetic operations (FIG. 4). The multiplication operation and associated status operations may analyze and/or modify the numeric characteristics of the input value $X_{SCINT}$ and update status flags as indicated by the example status operations of FIGS. 5-9.

Figure 11:
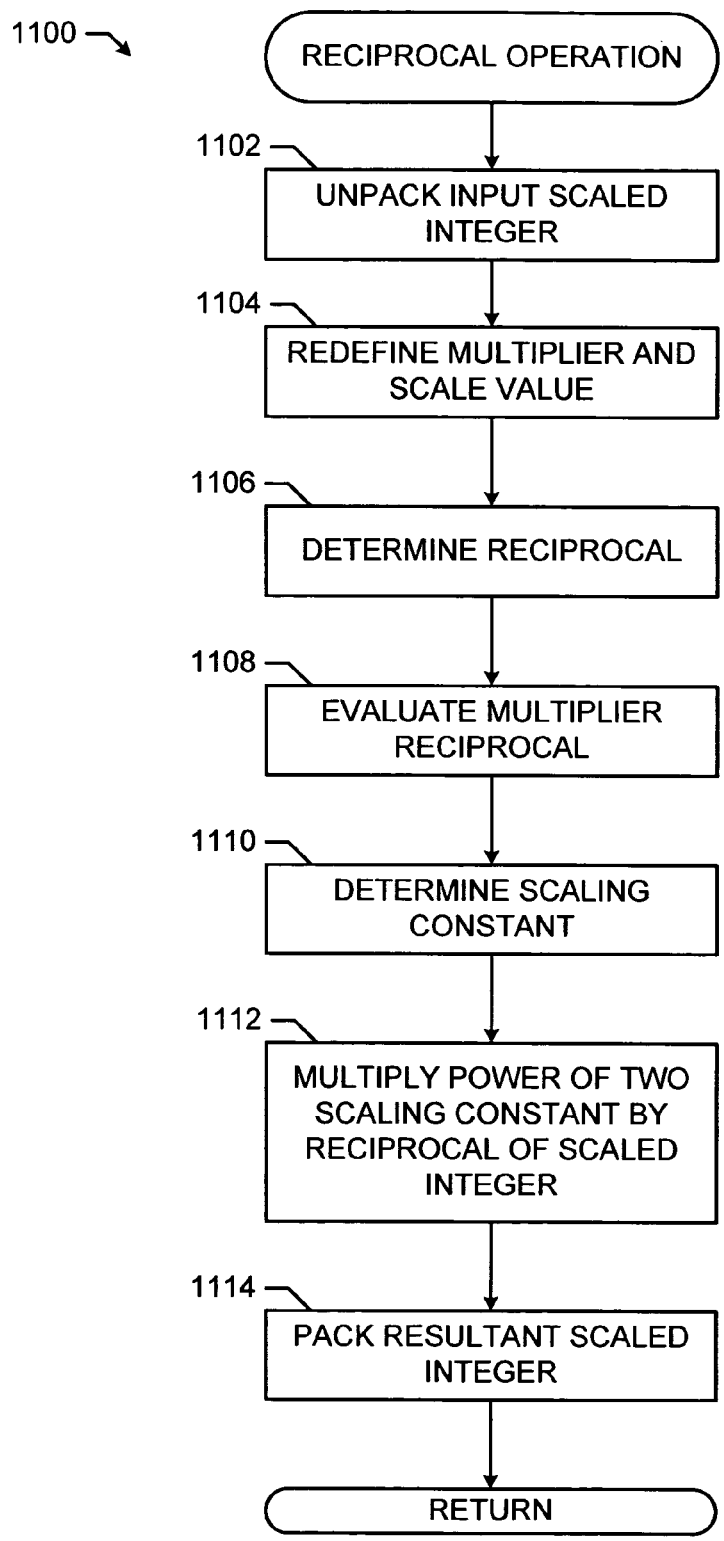
FIG. 11 is a flow diagram depicting an example manner in which a reciprocal operation may be performed using the example scaled-integer data type described in connection with FIG. 2, according to an embodiment of the disclosed apparatus and methods.

FIG. 11 is a flow diagram depicting an example manner in which a reciprocal operation may be performed using the example scaled-integer data type described in connection with FIG. 2 above. More specifically, the methods described in connection with FIG. 11 may be used to find a reciprocal of a scaled-integer value. The reciprocal of a scaled-integer value may be used to, for example, perform a division operation based on reciprocal multiplication (i.e., $X \div Y = X \cdot Y^{-1}$). Additionally, the methods of FIG. 11 may be implemented in hardware (e.g., the example system 1200 of FIG. 12) and/or software stored on a machine-readable medium and executed on a processor system (e.g., the processor system 1310 of FIG. 13).

An input value $X_{SCINT}$ is unpacked by separating or parsing an input multiplier value I and an input scale value Q from the input value $X_{SCINT}$ to generate an input scaled-integer value (I,Q) (block 1102). The input multiplier value I and the input scale value Q are then redefined or scaled (block 1104) to generate a scaled-integer value (I',Q') having a scaled multiplier value I' and a scaled scale value Q', where the scaled multiplier value I' is within the range $1 \leq I' < 2$. More specifically, the scaled multiplier value I' and the scaled scale value Q' may be determined by setting the numeric equivalent value of the input scaled-integer value (I,Q) (as set forth in Equation 3 above) equal to the numeric equivalent value of the scaled-integer value (I', Q'), selecting a scaled multiplier value I' within the range $1 \leq I' < 2$, and solving for the scaled scale value Q' as shown in Equation 30 below.

$$I' \cdot 2^{Q'-\beta} = I \cdot 2^{Q-\beta} \rightarrow Q' = \log_2\left(\frac{I \cdot 2^{Q-\beta}}{I'}\right) + \beta \quad \text{Equation 30}$$

A reciprocal value of the scaled-integer value (I',Q') is then determined based on the scaled multiplier value I' and the scaled scale value Q' (block 1106). The reciprocal value is determined as set forth in Equation 31 below.

$$\frac{1}{I \cdot 2^{Q-\beta}} \rightarrow \frac{1}{I' \cdot 2^{Q'-\beta}}, \text{ where } 1 \leq I' < 2 \quad \text{Equation 31}$$

As shown in Equation 31, the reciprocal value $$\frac{1}{I' \cdot 2^{Q'-\beta}}$$

of the input scaled-integer value (I,Q) is proportional to the reciprocal value of the scaled-integer value (I', Q'), where $1 \leq I' < 2$.

The value of the reciprocal of the scaled multiplier value $$I'\left(\text{i.e., } \frac{1}{I'}\right)$$

is then determined (block 1108). Determining the value of the reciprocal of the scaled multiplier value $$\frac{1}{I'}$$

is similar or identical to determining the value of an inverse function. In particular, the value of an inverse function may be determined by determining an inverse function approximating polynomial p(x) in terms of an input variable x using, for example, a minimax approximation method. The value of the inverse function approximating polynomial p(x) may then be determined by setting the input variable value equal to the scaled multiplier value I' to generate an approximated reciprocal value $$p(I') \cdot \frac{1}{2^{Q'-\beta}}.$$

The value of a scaling constant s is determined (block 1110) so that the value of two raised to a power equal to the scaling constant s (i.e., $2^s$) multiplied by the reciprocal of the scaled multiplier value $$\frac{1}{I'}\left(\text{i.e., } \frac{2^s}{I'} \text{ or } 2^s \cdot p(I')\right)$$

results in a relatively large value. Determining a relatively large value of $$\frac{2^s}{I'}$$

so that operations (e.g., multiplication operations) that use the reciprocal of the input scaled-integer value (I,Q) can generate relatively precise results.

The value of two raised to a power equal to the scaling constant s ($2^s$) is then multiplied by the numerator and the denominator of the reciprocal value $$\frac{1}{I' \cdot 2^{Q'-\beta}}$$

(block 1112) to determine a reciprocal multiplier value $I_{recip}$ and a reciprocal scale value $Q_{recip}$ as shown in Equation 32 below.

$$(I_{recip}, Q_{recip}) = 2^s \cdot p(I') \cdot 2^{-(Q'+s)} \quad \text{Equation 32}$$
$$\approx \frac{2^s}{2^s} \cdot \frac{1}{I' \cdot 2^{Q'-\beta}}$$
$$= \frac{2^s}{I'} \cdot \frac{1}{2^{Q'-\beta} \cdot 2^s}$$

As shown in Equation 32, the product of two to the scaling constant s ($2^s$) and the inverse function approximation polynomial p(I') multiplied by two raised to a power equal to the negative result of the sum of the scaled scale value Q' and the scaling constant s is approximately equal to the result of multiplying two to the scaling constant s ($2^s$) by the numerator and the denominator of the reciprocal value $$\frac{1}{I' \cdot 2^{Q'-\beta}}.$$

The reciprocal multiplier value $I_{recip}$ and the reciprocal scale value $Q_{recip}$ are then packed into a scaled-integer data type format (e.g., the example binary representation 200 of FIG. 2) (block 1114).

Figure 12:
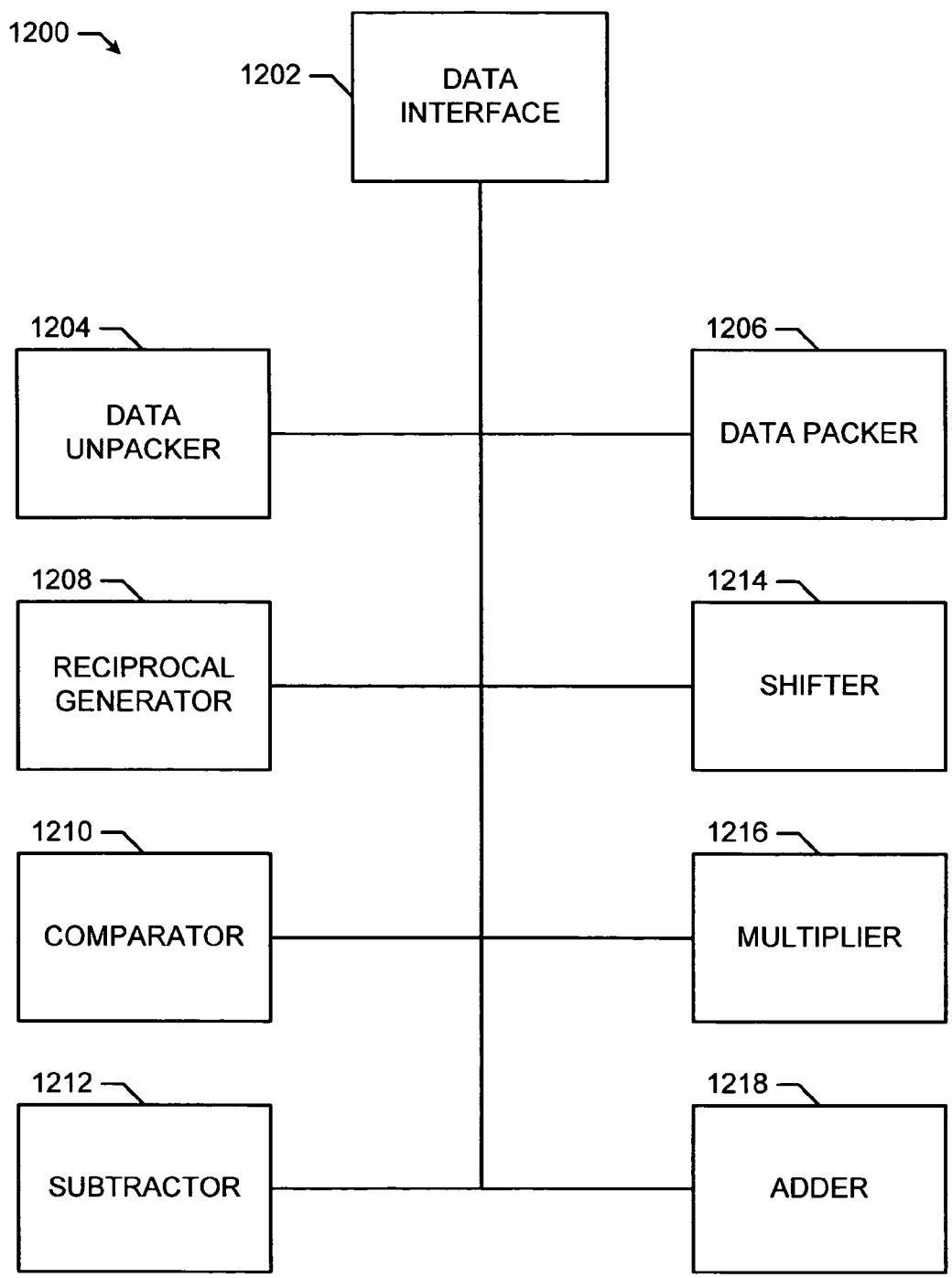
FIG. 12 is a block diagram of an example system that may be used to implement the apparatus and methods described herein.

FIG. 12 is a functional block diagram of an example system 1200 that may be used to implement the apparatus, methods, and articles of manufacture described herein. The structures shown in FIG. 12 may be implemented using any desired combination of hardware and/or software. For example, one or more integrated circuits, discrete semiconductor components, or passive electronic components may be used. Additionally or alternatively, some or all, or parts thereof, of the structures of FIG. 12 may be implemented using instructions, code, or other software and/or firmware, etc. stored on a computer-readable medium that, when executed by, for example, a processor system (e.g., the processor system 1310 of FIG. 13), perform the methods disclosed herein.

In general, the example system 1200 performs arithmetic operations and status operations based on the example scaled-integer data type described in connection with FIG. 2 above. Additionally, the example system 1200 may be configured to update status flags (e.g., the status flags described in connection with FIG. 4 above) based on the example extended arithmetic operations described in connection with FIG. 4 above and the example status operations described in connection with FIGS. 5-9 above. In general, the example system 1200 may be configured to perform the methods described herein during a runtime phase or any other operational state of the example system 1200 or the processor system 1310 (FIG. 13).

Now turning in detail to FIG. 12, the example system 1200 includes a data interface 1202, a data unpacker 1204, a data packer 1206, a reciprocal generator 1208, a comparator 1210, a subtractor 1212, a shifter 1214, a multiplier 1216, and an adder 1218, all of which may be communicatively coupled as shown. The data interface 1202 may be configured to obtain and store scaled-integer values, bias values β, and any other value associated with the operations described herein from, for example, a memory location. For example, the data interface 1202 may obtain scaled-integer values from a memory location and send them to the data unpacker 1204. Further, the data interface 1202 may obtain scaled-integer values from the data packer 1206 and store the scaled-integer values to one or more memory locations. Additionally or alternatively, the data interface 1202 may be configured to obtain and/or communicate scaled-integer values from operations (e.g., the example arithmetic operations described in connection with FIG. 3 above and the example status operations described in connection with FIGS. 5-9 above).

The data unpacker 1204 may obtain scaled-integer values in the scaled-integer data type format (e.g., the example binary representation 200 of FIG. 2) from any of the functional blocks of FIG. 12 and may be configured to unpack the scaled-integer values by separating or parsing a multiplier value I and a scale value Q from each of the scaled-integer values. Additionally, the data unpacker 1204 may be configured to communicate multiplier values I and scale values Q to any of the functional blocks of FIG. 12.

The data packer 1206 may obtain multiplier values I and corresponding scale values Q from any of the functional blocks of FIG. 12 and may be configured to pack the multiplier values I and the scale values Q into the scaled-integer data type format (e.g., the example binary representation 200 of FIG. 2). Additionally, the data packer 1206 may be configured to communicate the scaled-integer values in the scaled-integer data type format to any of the blocks of FIG. 12.

The reciprocal generator 1208 may be configured to obtain scaled-integer values and bias values β and generate reciprocal scaled-integer values as described in connection with the methods of FIG. 11. Additionally, the reciprocal generator 1208 may be configured to communicate reciprocal scaled-integer values to any of the functional blocks of FIG. 12.

The comparator 1210 may be configured to obtain scaled-integer values and perform comparisons. For example, the comparator 1210 may be configured to compare scaled-integer values with numeric range limits such as multiplier numeric range limits $I_{min}$ and $I_{max}$ and scale numeric range limits $Q_{min}$ and $Q_{max}$. The comparator 1210 may also be configured to perform zero test comparisons such as the zero test associated with the example zero-checking operation 500 (FIG. 5) and the example left-normalization operation 700 (FIG. 7). Additionally, the comparator 1210 may be configured to obtain other values such as the non-negative integer value k described in connection with FIGS. 6 and 7 above and perform the comparisons described in connection with the example right-normalization operation 600 (FIG. 6) and the example left-normalization operation 700. Furthermore, the comparator 1210 may be configured to perform the comparisons described in connection with the example status operations of FIGS. 5-9.

The subtractor 1212 may be configured to obtain scaled-integer values and bias values β and perform subtraction operations based on the scaled-integer values and/or the bias value β. For example, the subtraction of the scale value Q and the bias value β of the numeric conversion of a scaled-integer encoded value set forth in Equation 3 above may be performed by the subtractor 1212. Additionally, the subtraction operation of the input multiplier values $I_x$ and $I_y$ of Equation 12 above may also be performed by the subtractor 1212.

The shifter 1214 may be configured to perform shift operations and/or division operation via shift operations based on the scaled-integer values and/or other values. For example, the intermediate multiplier values $I'_x$ and $I'_y$ described in connection with FIG. 3 above may be determined according to Equations 14 and 15 above. In particular, the first intermediate multiplier value $I'_x$ may be determined based on right-shifting the first input multiplier value $I_x$ a number of times equal to the value of $Q_{max}-Q_x$.

The shifter 1214 may also be configured to shift values such as, for example, the value of the term $$\frac{I}{2^k}$$

of the numeric range conditions set forth in Equations 21 and 22 above. For example, the shifter 1214 may be configured to evaluate the term $$\frac{I}{2^k}$$

by right-shifting the multiplier value $I$ a number of times equal to the non-negative integer value k.

The multiplier 1216 may be configured to perform multiplication operations based on scaled-integer values and any other values associated with the methods described herein. For example, the multiplier 1216 may be configured to perform the multiplication operation of scaled-integer values described in connection with the example arithmetic operations (FIG. 3). The multiplier 1216 may also be used to perform the multiplication of the scaled-integer numeric evaluation of Equation 3 above. In particular, the multiplier 1216 may be configured to multiply the multiplier value $I$ by the result of two raised to a power equal to the compound scale exponent (i.e., Q–β). Additionally, the multiplier 1216 may be used to perform division operations based on reciprocal multiplication by, for example, receiving a scaled-integer reciprocal value from the reciprocal generator 1208 and multiplying the scaled-integer reciprocal by another scaled-integer value.

The adder 1218 may be used to perform addition operations based on scaled-integer values and any other values associated with the methods described herein. For example, the adder 1218 may be configured to perform addition operations of scaled-integer values as described in connection with FIG. 3. The adder 1218 may also be configured to add exponents such as, for example, the exponent (1+β) of Equations 6 and 7 above.

FIG. 13 is a block diagram of an example processor system 1310 that may be used to implement the apparatus and methods described herein. As shown in FIG. 13, the processor system 1310 includes a processor 1312 that is coupled to an interconnection bus or network 1314. The processor 1312 includes a register set or register space 1316, which is depicted in FIG. 13 as being entirely on-chip, but which could alternatively be located entirely or partially off-chip and directly coupled to the processor 1312 via dedicated electrical connections and/or via the interconnection network or bus 1314. The processor 1312 may be any suitable processor, processing unit or microprocessor such as, for example, a processor from the Intel X-Scale™ family, the Intel Pentium™ family, etc. In the example described in detail below, the processor 1312 is a thirty-two bit Intel processor, which is commonly referred to as an IA-32 processor. Although not shown in FIG. 13, the system 1310 may be a multi-processor system and, thus, may include one or more additional processors that are identical or similar to the processor 1312 and which are coupled to the interconnection bus or network 1314.

The processor 1312 of FIG. 13 is coupled to a chipset 1318, which includes a memory controller 1320 and an input/output (I/O) controller 1322. As is well known, a chipset typically provides I/O and memory management functions as well as a plurality of general purpose and/or special purpose registers, timers, etc. that are accessible or used by one or more processors coupled to the chipset. The memory controller 1320 performs functions that enable the processor 1312 (or processors if there are multiple processors) to access a system memory 1324 and a non-volatile memory 1325.

The system memory 1324 may include any desired type of volatile memory such as, for example, static random access memory (SRAM), dynamic random access memory (DRAM), etc. The non-volatile memory 1325 may include any desired type of non-volatile memory such as flash memory or read-only memory (ROM).

The I/O controller 1322 performs functions that enable the processor 1312 to communicate with peripheral input/output (I/O) devices 1326 and 1328 via an I/O bus 1330. The I/O devices 1326 and 1328 may be any desired type of I/O device such as, for example, a keyboard, a video display or monitor, a mouse, etc. While the memory controller 1320 and the I/O controller 1322 are depicted in FIG. 13 as separate functional blocks within the chipset 1318, the functions performed by these blocks may be integrated within a single semiconductor circuit or may be implemented using two or more separate integrated circuits.

The methods described herein may be implemented using instructions stored on a computer readable medium that are executed by the processor 1312. The computer readable medium may include any desired combination of solid state, magnetic and/or optical media implemented using any desired combination of mass storage devices (e.g., disk drive), removable storage devices (e.g., floppy disks, memory cards or sticks, etc.) and/or integrated memory devices (e.g., random access memory, flash memory, etc.).

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method comprising:
   identifying a scaled-integer value;
   determining a multiplier value by extracting first information from a first portion of a bitfield based on the scaled-integer value, wherein the first portion of the bitfield is configurable to include a first signed integer value;
   determining a scale value by extracting second information from a second portion of the bitfield based on the scaled-integer value, wherein the second portion of the bitfield is configurable to include a second signed integer value;

generating a graphic based on the multiplier value and the scale value; and displaying the graphic via a display.

2. A method as defined in claim 1, further comprising performing one of a two's complement arithmetic operation or an integer arithmetic operation.

3. A method as defined in claim 1, wherein the first and second portions of the bitfield are associated with a memory location.

4. A method as defined in claim 1, further comprising performing a status operation based on at least one of the multiplier value or the scale value.

5. An apparatus comprising:

a processor system; and a memory communicatively coupled to the processor system, the memory including stored instructions that enable the processor system to:

identify a scaled-integer value;

determine a multiplier value by extracting first information from a first portion of a bitfield based on the scaled-integer value, wherein the first portion of the bitfield is configurable to include a first signed integer value;

determine a scale value by extracting second information from a second portion of the bitfield based on the scaled-integer value, wherein the second portion of the bitfield is configurable to include a second signed integer value;

generate a graphic based on the multiplier value and the scale value; and display the graphic via a display.

6. An apparatus as defined in claim 5, further comprising performing at least one of a two's complement arithmetic operation or an integer arithmetic operation.

7. An apparatus as defined in claim 5, wherein the first and second portions of the bitfield are associated with a memory location.

8. An apparatus as defined in claim 5, wherein the stored instructions enable the processor system to perform a status operation based on at least one of the multiplier value or the scale value.

9. A machine accessible medium having instructions stored thereon that, when executed, cause a machine to:

identify a scaled-integer value;

determine a multiplier value by extracting first information from a first portion of a bitfield based on the scaled-integer value, wherein the first portion of the bitfield is configurable to include a first signed integer value;

determine a scale value by extracting second information from a second portion of the bitfield based on the scaled-integer value, wherein the second portion of the bitfield is configurable to include a second signed integer value;

perform an arithmetic operation based on the multiplier value and the scale value; and store a second multiplier value and a second scale value representative of a numeric value resulting from the arithmetic operation in a second bitfield for use by the machine to perform subsequent operations based on the numeric value.

10. A machine accessible medium as defined in claim 9, wherein the arithmetic operation is at least one of a two's complement arithmetic operation or an integer arithmetic operation.

11. A machine accessible medium as defined in claim 9, wherein the first and second portions of the bitfield are associated with a memory location.

12. A machine accessible medium as defined in claim 9 having instructions stored thereon that, when executed, cause the machine to perform a status operation based on at least one of the multiplier value or the scale value.

13. A method comprising:

identifying a bias value;

identifying a first input value;

identifying a first scale value;

determining a first multiplier value based on the first input value, the first scale value, and the bias value;

storing the first multiplier value in a first bitfield portion, wherein the first bitfield portion is configurable to be a first signed integer value;

identifying a second input value;

identifying a second scale value;

determining a second multiplier value based on the second input value, the second scale value, and the bias value;

storing the second multiplier value in a second bitfield portion, wherein the second bitfield portion is configurable to be a second signed integer value;

generating a graphic based on the first multiplier value, the first scale value, the second multiplier value, and the second scale value; and displaying the graphic via a display.

14. A method as defined in claim 13, wherein the first multiplier value is determined by dividing the first input value by the value of the bias value subtracted from the first scale value and raised to the power of two.

15. A method as defined in claim 13, further comprising performing an addition operation that adds the first multiplier value to the second multiplier value.

16. A method as defined in claim 13, further comprising performing a multiplication operation that multiplies the first multiplier value by the second multiplier value and subtracts the bias value from the sum of the first scale value and the second scale value.

17. A method as defined in claim 13, further comprising identifying at least one of a minimum scale value, a maximum scale value, a minimum multiplier value or a maximum multiplier value.

18. A method as defined in claim 17, further comprising performing a status operation based on at least one of the minimum scale value, the maximum scale value, the minimum multiplier value, or the maximum multiplier value.

19. An apparatus comprising:

a processor system; and a memory communicatively coupled to the processor system, the memory including stored instructions that enable the processor system to:

identify a bias value;

identify a first input value;

identify a first scale value;

determine a first multiplier value based on the first input value, the first scale value, and the bias value;

store the first multiplier value in a first bitfield portion, wherein the first bitfield portion of the bitfield is configurable to be a first signed integer value;

identify a second input value;

identify a second scale value;

determine a second multiplier value based on the second input value, the second scale value, and the bias value;

store the second multiplier value in a second bitfield portion, wherein the second bitfield portion is configurable to be a second signed integer value;

generate a graphic based on the first multiplier value, the first scale value, the second multiplier value, and the second scale value; and display the graphic via a display.

20. An apparatus as defined in claim 19, wherein the stored instructions enable the processor system to determine the first multiplier value by dividing the first input value by the value of the bias value subtracted from the first scale value and raised to the power of two.

21. An apparatus as defined in claim 19, wherein the stored instructions enable the processor system to perform an addition operation that adds the first multiplier value to the second multiplier value.

22. An apparatus as defined in claim 19, wherein the stored instructions enable the processor system to perform a multiplication operation that multiplies the first multiplier value by the second multiplier value and subtracts the bias value from the sum of the first scale value and the second scale value.

23. An apparatus as defined in claim 19, wherein the stored instructions enable the processor system to identify at least one of a minimum scale value, a maximum scale value, a minimum multiplier value, or a maximum multiplier value.

24. An apparatus as defined in claim 23, wherein the stored instructions enable the processor system to perform a status operation based on at least one of the minimum scale value, the maximum scale value, the minimum multiplier value, or the maximum multiplier value.

25. A machine accessible medium having instructions stored thereon that, when executed, cause a machine to:
identify a bias value;
identify a first input value;
identify a first scale value;
determine a first multiplier value based on the first input value, the first scale value, and the bias value;
store the first multiplier value in a first bitfield portion, wherein the first bitfield portion is configurable to be a first signed integer value;
identify a second input value;
identify a second scale value;
determine a second multiplier value based on the second input value, the second scale value, and the bias value;
store the second multiplier value in a second bitfield portion, wherein the second bitfield portion is configurable to be a second signed integer value;
perform an integer-based operation based on the first multiplier value, the first scale value, the second multiplier value, and the second scale value; and
store a third multiplier value and a third scale value representative of a numeric value resulting from the integer-based operation for use by the machine to perform subsequent operations based on the numeric value.

26. A machine accessible medium as defined in claim 25 having instructions stored thereon that, when executed, cause a machine to determine the first multiplier value by dividing the first input value by the value of the bias value subtracted from the first scale value and raised to the power of two.

27. A machine accessible medium as defined in claim 25, wherein the integer-based operation is an addition operation that adds the first multiplier value to the second multiplier value.

28. A machine accessible medium as defined in claim 25, wherein the integer-based operation is a multiplication operation that multiplies the first multiplier value by the second multiplier value and subtracts the bias value from the sum of the first scale value and the second scale value.

29. A machine accessible medium as defined in claim 25 having instructions stored thereon that, when executed, cause the machine to identify at least one of a minimum scale value, a maximum scale value, a minimum multiplier value, or a maximum multiplier value.

30. A machine accessible medium as defined in claim 29 having instructions stored thereon that, when executed, cause the machine to perform a status operation based on at least one of the minimum scale value, the maximum scale value, the minimum multiplier value, or the maximum multiplier value.

31. A method comprising:
identifying a bias value;
identifying a first input value;
identifying a first multiplier value;
determining a first scale value based on the first input value, the first multiplier value, and the bias value;
storing the first scale value in a first bitfield portion, wherein the first bitfield portion is configurable to be a first signed integer value;
identifying a second input value;
identifying a second multiplier value;
determining a second scale value based on the second input value, the second multiplier value, and the bias value;
storing the second scale value in a second bitfield portion, wherein the second bitfield portion is configurable to be a second signed integer value;
generating a graphic based on the first multiplier value, the first scale value, the second multiplier value, and the second scale value; and
displaying the graphic via a display.

32. A method as defined in claim 31, wherein determining the first scale value includes adding the bias value to a log base two function of the quotient of the first input value divided by the first multiplier value.

33. A method as defined in claim 31, further comprising performing an addition operation that adds the first multiplier value to the second multiplier value.

34. A method as defined in claim 31, further comprising performing a multiplication operation that multiplies the first multiplier value by the second multiplier value and subtracts the bias value from the sum of the first scale value and the second scale value.

35. An apparatus comprising:
a processor system; and
a memory communicatively coupled to the processor system, the memory including stored instructions that enable the processor system to:
identify a bias value;
identify a first input value;
identify a first multiplier value;
determine a first scale value based on the first input value, the first multiplier value, and the bias value;
store the first scale value in a first bitfield portion, wherein the first bitfield portion is configurable to be a first signed integer value;
identify a second input value;
identify a second multiplier value;
determine a second scale value based on the second input value, the second multiplier value, and the bias value;

store the second scale value in a second bitfield portion, wherein the second bitfield portion is configurable to be a second signed integer value;

generate a graphic based on the first multiplier value, the first scale value, the second multiplier value, and the second scale value; and display the graphic via a display.

36. An apparatus as defined in claim 35, wherein the stored instructions enable the processor system to determine the first scale value by adding the bias value to a log base two function of the quotient of the first input value divided by the first multiplier value.

37. An apparatus as defined in claim 35, wherein the stored instructions enable the processor system to perform an addition operation that adds the first multiplier value to the second multiplier value.

38. An apparatus as defined in claim 35, wherein the stored instructions enable the processor system to perform a multiplication operation that multiplies the first multiplier value by the second multiplier value and subtracts the bias value from the sum of the first scale value and the second scale value.

39. A machine accessible medium having instructions stored thereon that, when executed, cause a machine to:
identify a bias value;
identify a first input value;
identify a first multiplier value;
determine a first scale value based on the first input value, the first multiplier value, and the bias value;
store the first scale value in a first bitfield portion, wherein the first bitfield portion is configurable to be a first signed integer value;
identify a second input value;
identify a second multiplier value;
determine a second scale value based on the second input value, the second multiplier value, and the bias value;
store the second scale value in a second bitfield portion, wherein the second bitfield portion is configurable to be a second signed integer value;
perform an integer-based operation based on the first multiplier value, the first scale value, the second multiplier value, and the second scale value; and
store a third multiplier value and a third scale value representative of a numeric value resulting from the integer-based operation for use by the machine to perform subsequent operations based on the numeric value.

40. A machine accessible medium as defined in claim 39 having instructions stored thereon that, when executed, cause the machine to determine the first scale value by adding the bias value to a log base two function of the quotient of the first input value divided by the first multiplier value.

41. A machine accessible medium as defined in claim 39, wherein the integer-based operation is an addition operation that adds the first multiplier value to the second multiplier value.

42. A machine accessible medium as defined in claim 39, wherein the integer-based operation is a multiplication operation that multiplies the first multiplier value by the second multiplier value and subtracts the bias value from the sum of the first scale value and the second scale value.

43. An apparatus comprising:
a data interface configurable to identify a first scaled-integer value and a second scaled-integer value; and
a data unpacker communicatively coupled to the data interface and configurable to identify a first multiplier value in a first portion of a first bitfield and a first scale value in a second portion of the first bitfield based on the first scaled-integer value and a second multiplier value in a first portion of a second bitfield and a second scale value in a second portion of the second bitfield based on the second scaled-integer value, wherein each of the first and second portions of the first bitfield and each of the first and second portions of the second bitfield is configurable to include a signed integer value.

44. An apparatus as defined in claim 43, further comprising an adder configurable to perform an addition operation by adding the first multiplier value to the second multiplier value and the first scale value to the second scale value.

45. An apparatus as defined in claim 44, wherein the adder is configurable to perform a two's complement addition operation based on at least one of the first multiplier value or the second multiplier value.

46. An apparatus as defined in claim 43, further comprising a multiplier configurable to perform a multiplication operation by multiplying the first multiplier value by the second multiplier value and subtracting a bias value from the sum of the first scale value and the second scale value.

47. An apparatus as defined in claim 46, wherein the multiplier is configurable to perform a two's complement multiplication operation based on at least one of the first multiplier value, the second multiplier value, the first scale value, or the second scale value.

48. An apparatus comprising:
a processor system; and
a flash memory communicatively coupled to the processor system, the flash memory including stored instructions that enable the processor system to:
identify a bias value;
identify a first input value;
identify a first scale value;
determine a first multiplier value based on the first input value, the first scale value, and the bias value;
store the first multiplier value in a first bitfield portion, wherein the first bitfield portion is configurable to be a first signed integer value;
identify a second input value;
identify a second scale value;
determine a second multiplier value based on the second input value, the second scale value, and the bias value;
store the second multiplier value in a second bitfield portion, wherein the second bitfield portion is configurable to include a second signed integer value;
perform an integer-based operation based on the first multiplier value, the first scale value, the second multiplier value, and the second scale value; and
store a third multiplier value and a third scale value representative of a numeric value resulting from the integer-based operation for use by the processor system to perform subsequent operations based on the numeric value.

49. An apparatus as defined in claim 48, wherein the integer-based operation is a two's complement arithmetic operation.

50. A method comprising:
receiving a request to perform an arithmetic operation;
executing a set of instructions in a processor in response to the request to perform the arithmetic operation based on a scaled-integer value, wherein execution of the instructions causes the processor to:

identify the scaled-integer value;

determine a multiplier value by extracting first information from a first portion of a bitfield based on the scaled-integer value, wherein the first portion of the bitfield is configurable to include a first signed integer value;

determine a scale value by extracting second information from a second portion of the bitfield based on the scaled-integer value, wherein the second portion of the bitfield is configurable to include a second signed integer value;

perform the arithmetic operation based on the multiplier value and the scale value; and store a second multiplier value and a second scale value representative of a numeric value resulting from the arithmetic operation for use by the processor to perform subsequent operations based on the numeric value.

51. A method as defined in claim 50, wherein the arithmetic operation is one of a two's complement arithmetic operation or an integer arithmetic operation.

* * * * *

UNITED STATES PATENT AND TRADEMARK OFFICE
CERTIFICATE OF CORRECTION

PATENT NO. : 7,290,024 B2  
APPLICATION NO. : 10/740086  
DATED : October 30, 2007  
INVENTOR(S) : Tang et al.

Page 1 of 1

It is certified that error appears in the above-identified patent and that said Letters Patent is hereby corrected as shown below:

Col. 26, line 61 after "bitfield portion" delete --of the bitfield--.

Signed and Sealed this

Twenty-fifth Day of December, 2007

JON W. DUDAS  
*Director of the United States Patent and Trademark Office*